(12) United States Patent
Ye et al.

(10) Patent No.: US 11,218,689 B2
(45) Date of Patent: Jan. 4, 2022

(54) METHODS AND SYSTEMS FOR SELECTIVE SENSOR FUSION

(71) Applicant: SZ DJI TECHNOLOGY CO., LTD., Shenzhen (CN)

(72) Inventors: Changchun Ye, Shenzhen (CN); Jiaqi Yan, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/410,943

(22) Filed: May 13, 2019

(65) Prior Publication Data

US 2019/0273909 A1 Sep. 5, 2019

Related U.S. Application Data

(63) Continuation of application No. PCT/CN2016/105785, filed on Nov. 14, 2016.

(51) Int. Cl.
*H04N 13/289* (2018.01)
*H04N 13/239* (2018.01)
(Continued)

(52) U.S. Cl.
CPC ........... *H04N 13/289* (2018.05); *G01B 11/14* (2013.01); *G01B 11/22* (2013.01); *G01C 21/206* (2013.01);
(Continued)

(58) Field of Classification Search
CPC .......... H04N 13/289; H04N 2013/0081; G06T 7/593; G01B 11/14
(Continued)

(56) References Cited

U.S. PATENT DOCUMENTS 8,655,619 B1 2/2014 Mannas et al.
9,738,381 B1 * 8/2017 Loud .................... G05D 1/0094
(Continued)

FOREIGN PATENT DOCUMENTS

CN 102789233 A 11/2012
CN 103529692 A 1/2014
(Continued)

OTHER PUBLICATIONS

World Intellectual Property Organization (WIPO) International Search Report and Written Opinion for PCT/CN2016/105785 dated Aug. 15, 2017 9 Pages.
(Continued)

*Primary Examiner* — Brian P Yenke
(74) *Attorney, Agent, or Firm* — Anova Law Group, PLLC

(57) ABSTRACT

A method includes obtaining a spatial configuration of a plurality of imaging devices relative to one another and to a movable object. The imaging devices are coupled to the movable object and comprise a first imaging device configured to operate in a multi-ocular mode and a second imaging device configured to operate in a monocular mode. The method further includes determining at least one of a distance of the movable object to an object or surface lying within a field-of-view of at least one of the imaging devices, a disparity between matched points in stereoscopic images acquired by the first imaging device, or an environment in which the plurality of imaging devices are operated. The distance is determined based in part on the spatial configuration. The method also includes selecting either the first imaging device or the second imaging device to acquire image data based on the determination.

19 Claims, 13 Drawing Sheets

(51) Int. Cl.
G06T 7/579 (2017.01)
G06T 7/593 (2017.01)
G06T 7/70 (2017.01)
G06T 7/20 (2017.01)
G01B 11/14 (2006.01)
G01B 11/22 (2006.01)
H04N 5/225 (2006.01)
H04N 5/247 (2006.01)
G01C 21/20 (2006.01)
H04N 13/00 (2018.01)

(52) U.S. Cl.
CPC .............. *G06T 7/20* (2013.01); *G06T 7/579* (2017.01); *G06T 7/593* (2017.01); *G06T 7/70* (2017.01); *H04N 5/2253* (2013.01); *H04N 5/247* (2013.01); *H04N 13/239* (2018.05); *G06T 2207/10004* (2013.01); *G06T 2207/10012* (2013.01); *G06T 2207/10028* (2013.01); *H04N 2013/0081* (2013.01)

(58) Field of Classification Search
USPC .......... 348/144, 142, 143, 139, 208.14, 116
See application file for complete search history.

(56) References Cited

U.S. PATENT DOCUMENTS

| | | | | |
|---|---|---|---|---|
| 9,778,661 | B2* | 10/2017 | Wang | H04N 7/181 |
| 10,148,870 | B2* | 12/2018 | Inoue | H04N 5/23296 |
| 10,198,634 | B2* | 2/2019 | Zhou | G06K 9/6228 |
| 10,240,930 | B2* | 3/2019 | Zhou | G01C 21/165 |
| 10,277,888 | B2* | 4/2019 | Campbell | H04N 13/239 |
| 10,306,143 | B2* | 5/2019 | Chien | G02B 13/001 |
| 10,565,732 | B2* | 2/2020 | Zhao | G01C 25/005 |
| 10,730,618 | B2* | 8/2020 | Yan | B64C 39/024 |
| 10,732,647 | B2* | 8/2020 | Shen | G01C 21/165 |
| 10,771,699 | B2* | 9/2020 | Zhou | H04N 5/2329 |
| 10,802,509 | B2* | 10/2020 | Wang | B64C 39/024 |
| 10,863,072 | B2* | 12/2020 | Li | B64C 39/024 |
| 10,979,645 | B2* | 4/2021 | Kim | H04N 5/23238 |
| 11,015,956 | B2* | 5/2021 | Tang | G06T 7/80 |
| 11,019,255 | B2* | 5/2021 | Hu | H04N 5/23229 |
| 11,041,958 | B2* | 6/2021 | Li | G01S 13/862 |
| 2004/0179729 | A1* | 9/2004 | Imai | G08B 13/1963 |
| | | | | 382/154 |
| 2010/0235129 | A1* | 9/2010 | Sharma | G01S 7/4972 |
| | | | | 702/97 |
| 2013/0120536 | A1* | 5/2013 | Song | G06T 7/0002 |
| | | | | 348/46 |
| 2015/0015673 | A1* | 1/2015 | Matono | H04N 13/239 |
| | | | | 348/47 |
| 2015/0036886 | A1* | 2/2015 | Matono | G08G 1/166 |
| | | | | 382/106 |
| 2016/0076892 | A1* | 3/2016 | Zhou | B64D 47/08 |
| | | | | 701/3 |
| 2016/0240085 | A1* | 8/2016 | Otsuka | H04N 13/239 |
| 2017/0068252 | A1* | 3/2017 | Yu | B64C 29/0025 |
| 2017/0123425 | A1* | 5/2017 | Zhao | G06K 9/0063 |
| 2017/0153122 | A1* | 6/2017 | Tang | B64D 47/08 |
| 2017/0310946 | A1* | 10/2017 | Ge | H04N 13/286 |
| 2019/0113537 | A1* | 4/2019 | Zhou | G05D 1/0011 |
| 2019/0172215 | A1* | 6/2019 | Zhang | G06T 7/579 |
| 2019/0180463 | A1* | 6/2019 | Tsunashima | G06K 9/209 |
| 2019/0281214 | A1* | 9/2019 | Hu | H04N 5/232 |
| 2019/0370983 | A1* | 12/2019 | Zhou | G05D 1/101 |
| 2020/0064483 | A1* | 2/2020 | Li | G01S 17/87 |
| 2020/0221062 | A1* | 7/2020 | Zhou | H04N 13/128 |
| 2020/0267323 | A1* | 8/2020 | Zhou | G01S 17/00 |
| 2020/0284580 | A1* | 9/2020 | Sasamoto | G01C 3/14 |
| 2020/0349366 | A1* | 11/2020 | Takemura | H04N 13/286 |
| 2020/0357108 | A1* | 11/2020 | Zhou | G05D 1/08 |
| 2020/0357141 | A1* | 11/2020 | Zhou | G06T 7/593 |
| 2021/0096232 | A1* | 4/2021 | Zhou | G01S 11/12 |
| 2021/0097696 | A1* | 4/2021 | Ye | H04N 5/14 |
| 2021/0103293 | A1* | 4/2021 | Li | B64D 47/08 |

FOREIGN PATENT DOCUMENTS

| | | |
|---|---|---|
| CN | 104236548 A | 12/2014 |
| CN | 104854428 A | 8/2015 |
| CN | 105022397 A | 11/2015 |
| CN | 105346706 A | 2/2016 |
| CN | 105700550 A | 6/2016 |
| CN | 105814875 A | 7/2016 |
| CN | 105931240 A | 9/2016 |
| JP | 2001224064 A | 8/2001 |

OTHER PUBLICATIONS

The World Intellectual Property Organization (WIPO) International Search Report and Written Opinion for PCT/CN2016/105747 dated Apr. 26, 2017.

* cited by examiner

Part A

Part B

Part A   Part B

Part C

METHODS AND SYSTEMS FOR SELECTIVE SENSOR FUSION

CROSS-REFERENCE TO RELATED APPLICATION

This application is a continuation of International Application No. PCT/CN2016/105785, filed on Nov. 14, 2016, the entire content of which is incorporated herein by reference.

BACKGROUND

Unmanned vehicles, such as ground vehicles, air vehicles, surface vehicles, underwater vehicles, and spacecraft, have been developed for a wide range of applications including surveillance, search and rescue operations, exploration, and other fields. Such unmanned vehicles can often be controlled and navigated by a remote controller. In some instances, unmanned vehicles can be autonomous vehicles capable of sensing and navigating through an environment without guidance from a human controller.

Various types of sensors can be used to generate positional and motion information enabling control and navigation of an unmanned vehicle. However, current sensing systems for unmanned vehicles can be less than ideal. For example, most sensing systems are based on a single thread decision model that does not have redundancies built-in. A single thread decision model lacks a hierarchical voting scheme for determining which sensors to utilize, particularly when one or more sensors are malfunctioning or generating inaccurate data due to certain environmental conditions (e.g., indoors or outdoors, high altitude or low altitude). This limited selective sensing ability may reduce the usefulness and safety of unmanned vehicles in certain applications.

SUMMARY

A need exists for multi-sensor sensing systems that have built-in redundancy, and that employ a multi-thread hierarchical decision algorithm for selecting which sensors and/or data to utilize under various conditions. The present disclosure addresses this need and provides related advantages as well. For example, the embodiments described herein can enhance flexibility and accuracy of navigation systems for movable objects such as aerial vehicles. In particular, the disclosed methods and systems can improve the operational safety margin/factor of unmanned vehicles, and enable these vehicles to be operated in a safe manner.

In one aspect of the disclosure, a method for determining a physical state of a movable object is provided. The method may comprise: obtaining a plurality of sets of sensor data from a plurality of sensing systems coupled to the movable object, the plurality of sets of sensor data comprising a distinct set of sensor data for each sensing system of the plurality of sensing systems; determining, for each sensing system of the plurality of sensing systems, a deviation between the corresponding set of sensor data and another set of sensor data for a different sensing system of the plurality of sensing systems; selecting one or more sets of sensor data from the plurality of sets of sensor data based at least in part on the deviations of the one or more sets of sensor data; and determining a physical state of the movable object based at least in part on the selected one or more sets of sensor data.

In another aspect of the disclosure, a system for determining a physical state of a movable object is provided. The system may comprise one or more processors that are configured to: obtain a plurality of sets of sensor data from a plurality of sensing systems coupled to the movable object, the plurality of sets of sensor data comprising a distinct set of sensor data for each sensing system of the plurality of sensing systems; determine, for each sensing system of the plurality of sensing systems, a deviation between the corresponding set of sensor data and another set of sensor data for a different sensing system of the plurality of sensing systems; select one or more sets of sensor data from the plurality of sets of sensor data based at least in part on the deviations of the one or more sets of sensor data; and determine a physical state of the movable object based at least in part on the selected one or more sets of sensor data.

A further aspect of the disclosure is directed to a non-transitory computer-readable storage medium with instructions stored thereon that, when executed by a computing system, causes the computing system to perform a method for determining a physical state of a movable object. The method performed may comprise: obtaining a plurality of sets of sensor data from a plurality of sensing systems coupled to the movable object, the plurality of sets of sensor data comprising a distinct set of sensor data for each sensing system of the plurality of sensing systems; determining, for each sensing system of the plurality of sensing systems, a deviation between the corresponding set of sensor data and another set of sensor data for a different sensing system of the plurality of sensing systems; selecting one or more sets of sensor data from the plurality of sets of sensor data based at least in part on the deviations of the one or more sets of sensor data; and determining a physical state of the movable object based at least in part on the selected one or more sets of sensor data.

In some embodiments, the movable object may be an unmanned aerial vehicle (UAV). The physical state of the movable object may be represented by a set of positional information and motion information of the movable object. In some embodiments, the plurality of different sensing systems may comprise an inertial measurement unit (IMU), a global positioning system (GPS) sensor, and a vision sensor.

In some embodiments, the above method may comprise determining deviations in the sensor data of each of the IMU, the GPS sensor, and the vision sensor relative to one another. The deviations may comprise (1) a first deviation of the GPS sensor data relative to the IMU sensor data, (2) a second deviation of the vision sensor data relative to the IMU sensor data, and (3) a third deviation of the vision sensor data relative to the GPS sensor data. The method may further comprise comparing the deviations to a plurality of predetermined thresholds for each pair of sensing systems selected from the IMU, the GPS sensor, and the vision sensor. The plurality of predetermined thresholds may comprise (1) a first predetermined threshold for the pair of GPS sensor and IMU sensing systems, (2) a second predetermined threshold for the pair of vision sensor and IMU sensing systems, and (3) a third predetermined threshold for the pair of vision sensor and GPS sensor sensing systems.

In some embodiments, the above method may comprise selectively fusing the GPS sensor data with the IMU sensor data when (1) the first deviation is equal to or less than the first predetermined threshold and (2) the second deviation is greater than the second predetermined threshold; and determining the physical state of the movable object based on the fused GPS-IMU sensor data. Alternatively, the method may comprise selectively fusing the vision sensor data with the IMU sensor data when (1) the second deviation is equal to or less than the first predetermined threshold and (2) the first deviation is greater than the second predetermined threshold; and determining the physical state of the movable object based on the fused vision-IMU sensor data.

In some embodiments, the method may comprise determining the physical state of the movable object based on only the IMU sensor data when the first and second deviations are respectively greater than the first and second predetermined thresholds. The method may comprise selectively fusing the GPS sensor data and/or the vision sensor data with the IMU sensor data when (1) the first and second deviations are respectively equal to or less than the first and second predetermined thresholds, and (2) the third deviation is equal to or less than the third predetermined threshold; and determining the physical state of the movable object depending on which of the GPS sensor data and/or the vision sensor data is fused with the IMU sensor data.

In some embodiments, the method may comprise selectively fusing the GPS sensor data and the vision sensor data without incorporating the IMU sensor data when (1) the first and second deviations are respectively equal to or less than the first and second predetermined thresholds, and (2) the third deviation is equal to or less than the third predetermined threshold; and determining the physical state of the movable object based on the fused GPS-vision sensor data.

In some embodiments, the method may comprise selectively fusing the GPS sensor data with the IMU sensor data when (1) the first and second deviations are respectively equal to or less than the first and second predetermined thresholds, (2) the third deviation is greater than the third predetermined threshold, and (3) the first deviation is less than the second deviation; and determining the physical state of the movable object based on the fused GPS-IMU sensor data.

In some embodiments, the method may comprise selectively fusing the vision sensor data with the IMU sensor data when (1) the first and second deviations are respectively equal to or less than the first and second predetermined thresholds, (2) the third deviation is greater than the third predetermined threshold, and (3) the second deviation is less than the first deviation; and determining the physical state of the movable object based on the fused vision-IMU sensor data.

In some embodiments, the method may comprise determining, using the sensor data of a first sensing system, an estimated physical state of the movable object during a time duration when the sensor data of a second sensing system is unavailable or is not updated. The method may comprise obtaining, from the sensor data of the second sensing system, a first observed physical state of the movable object when the sensor data of the second sensing system becomes available or is updated. The method may comprise determining, based on a first deviation between the first observed physical state and the estimated physical state of the movable object, whether to update the estimated physical state with the first observed physical state, wherein the first deviation is indicative of a validity of the sensor data of the second sensing system relative to the first sensing system. The determining of the estimated physical state may comprise extrapolating the sensor data of the first sensing system based on one or more previously-determined physical states of the movable object.

In some embodiments, the first deviation may be a measure of a dissimilarity between the first observed physical state and the estimated physical state. The method may comprise comparing the first deviation to a first predetermined threshold. The method may comprise determining the physical state of the movable object based on the estimated physical state and the first observed physical state, when the first deviation is equal to or less than the first predetermined threshold. The method may comprise determining the physical state of the UAV without using the first observed physical state, when the first deviation is greater than the first predetermined threshold. The method may comprise selecting the estimated physical state to be the physical state of the UAV, when the first deviation is greater than the first predetermined threshold. The method may further comprise obtaining, from the sensor data of a third sensing system, a second observed physical state of the movable object when the sensor data of the third sensing system becomes available or is updated.

In some embodiments, the second and third sensing systems may have sampling frequencies that are different from a sampling frequency of the first sensing system. The first sensing system may comprise an IMU, the second sensing system may comprise a GPS sensor, and the third sensing system may comprise a vision sensor.

In some embodiments, the method may comprise determining whether to update the estimated physical state with the second observed physical state based on a second deviation between the second observed physical state and the estimated physical state of the movable object, wherein the second deviation is indicative of a validity of the sensor data of the third sensing system relative to the first sensing system. The second deviation may be a measure of a dissimilarity between the second observed physical state and the estimated physical state. The method may further comprise comparing the second deviation to a second predetermined threshold. The method may comprise determining the physical state of the movable object based on the estimated physical state and the second observed physical state, when the second deviation is equal to or less than the second predetermined threshold. The method may comprise determining the physical state of the UAV without using the second observed physical state, when the second deviation is greater than the second predetermined threshold. The method may comprise selecting the estimated physical state to be the physical state of the UAV, when the second deviation is greater than the second predetermined threshold.

In some embodiments, the method may comprise determining the physical state of the movable object based on only the estimated physical state, when the first and second deviations are respectively greater than the first and second predetermined thresholds. The method may comprise determining the physical state of the movable object based on the estimated physical state and the first observed physical state, when (1) the first deviation is equal to or less than the first predetermined threshold, and (2) the second deviation is greater than the second predetermined threshold. The method may comprise determining the physical state of the movable object based on the estimated physical state and the second observed physical state, when (1) the second deviation is equal to or less than the second predetermined threshold, and (2) the first deviation is greater than the first predetermined threshold.

In some embodiments, the method may further comprise determining a third deviation between the first and second observed physical states of the movable object, wherein the third deviation is indicative of a validity of the sensor data of the third sensing system relative to the second sensing system. The third deviation may be determined when the first and second deviations are respectively equal to or less than the first and second predetermined thresholds. The method may further comprise comparing the third deviation to a third predetermined threshold. The method may comprise determining the physical state of the movable object based on the estimated physical state, the first observed physical state, and/or the second observed physical state, when the third deviation is equal to or less than the third predetermined threshold. The method may comprise determining the physical state of the movable object based on the first and second observed physical states without using the estimated physical state, when the third deviation is equal to or less than the third predetermined threshold.

In some embodiments, the method may comprise determining the physical state of the movable object based on the estimated physical state and the first observed physical state, and without using the second observed physical state, when (1) the third deviation is greater than the third predetermined threshold and (2) the first deviation is less than the second deviation. The method may comprise determining the physical state of the movable object based on the estimated physical state and the second observed physical state, and without using the first observed physical state, when (1) the third deviation is greater than the third predetermined threshold and (2) the second deviation is less than the first deviation.

In some embodiments, at least one of the first, second or third predetermined thresholds may be obtained from experimental data. At least one of the first, second or third predetermined thresholds may be configured to vary depending on one or more of the following: (1) an environment in which the movable object operates, (2) one or more motion characteristics of the movable object, (3) a location of the movable object, or (4) an altitude of the movable object.

In some embodiments, at least one of the first, second or third predetermined thresholds may be configured to vary in real-time when (1) the movable object moves from one type of environment to another type of environment, (2) the one or more motion characteristics of the movable object changes, (3) the location of the movable object changes, and/or (4) the altitude of the movable object changes.

In some embodiments, the first and second observed physical states of the movable object may depend on a plurality of different environment types in which the movable object operates. The plurality of different environment types may include distinct characteristics that are based on one or more of the following: (1) weather conditions, (2) object density and distribution, or (3) visual or physical properties of objects located within the different environment types. The first and second observed physical states of the movable object may depend on one or more operating conditions of the second and third sensing systems. The one or more operating conditions may include a signal strength, malfunction, power level, sensing accuracy, and/or calibration level of the second and third sensing systems.

In some embodiments, a suitability or an operating condition of the second and third sensing systems in an environment may be determined based on the first, second, and third deviations relative to the first, second, and third predetermined thresholds when the movable object is operating within the environment. The second sensing system may be determined to be (1) more suitable for a first environment type or is operating in a desired manner when the first deviation is equal to or less than the first predetermined threshold during operation of the movable object within the first environment type, and (2) unsuitable or less suitable for a second environment type or is malfunctioning when the first deviation is greater than the first predetermined threshold during operation of the movable object within the first environment type. The third sensing system may be determined to be (1) more suitable for a first environment type or is operating in a desired manner when the second deviation is equal to or less than the second predetermined threshold during operation of the movable object within the first environment type, and (2) unsuitable or less suitable for a second environment type or is malfunctioning when the second deviation is greater than the second predetermined threshold during operation of the movable object within the first environment type. The second sensing system may be determined to be more suitable than the third sensing system for a first environment type when the first deviation is less than the second deviation during operation of the movable object within the first environment type, and the third sensing system may be determined to be more suitable than the second sensing system for a second environment type when the second deviation is less than the first deviation during operation of the movable object within the second environment type.

A method of selecting a vision sensing mode is provided in another aspect of the disclosure. The method may comprise: obtaining a spatial configuration of a plurality of imaging devices relative to one another and to a movable object, wherein the plurality of imaging devices are coupled to the movable object and comprise (1) a first imaging device configured to acquire image data in a multi-ocular mode and (2) a second imaging device configured to acquire image data in a monocular mode; determining one or more of the following: (a) a distance of the movable object to an object or surface lying within a field-of-view of at least one imaging device, wherein the distance is determined based in part on the obtained spatial configuration, (b) a disparity between matched points in stereoscopic images from image data acquired by the first imaging device, or (c) an environment in which the plurality of imaging devices are operated; and selecting, based on the determining, either (1) the first imaging device to acquire image data in the multi-ocular mode or (2) the second imaging device to acquire image data in the monocular mode.

In another aspect of the disclosure, a system for selecting a vision sensing mode is provided. The system may comprise one or more processors that are configured to: obtain a spatial configuration of a plurality of imaging devices relative to one another and to a movable object, wherein the plurality of imaging devices are coupled to the movable object and comprise (1) a first imaging device configured to acquire image data in a multi-ocular mode and (2) a second imaging device configured to acquire image data in a monocular mode; determine one or more of the following: (a) a distance of the movable object to an object or surface lying within a field-of-view of at least one imaging device, wherein the distance is determined based in part on the obtained spatial configuration, (b) a disparity between matched points in stereoscopic images from image data acquired by the first imaging device, or (c) an environment in which the plurality of imaging devices are operated; and select, based on the determining, either (1) the first imaging device to acquire image data in the multi-ocular mode or (2) the second imaging device to acquire image data in the monocular mode.

A further aspect of the disclosure is directed to a non-transitory computer-readable storage medium with instructions stored thereon that, when executed by a computing system, causes the computing system to perform a method for selecting a vision sensing mode. The method may comprise: obtaining a spatial configuration of a plurality of imaging devices relative to one another and to a movable object, wherein the plurality of imaging devices are coupled to the movable object and comprise (1) a first imaging device configured to acquire image data in a multi-ocular mode and (2) a second imaging device configured to acquire image data in a monocular mode; determining one or more of the following: (a) a distance of the movable object to an object or surface lying within a field-of-view of at least one imaging device, wherein the distance is determined based in part on the obtained spatial configuration, (b) a disparity between matched points in stereoscopic images from image data acquired by the first imaging device, or (c) an environment in which the plurality of imaging devices are operated; and selecting, based on the determining, either (1) the first imaging device to acquire image data in the multi-ocular mode or (2) the second imaging device to acquire image data in the monocular mode.

In some embodiments, the multi-ocular mode may comprise a binocular mode or stereoscopic mode. In some embodiments, at least one of the plurality of imaging devices may be configured to switch between the multi-ocular mode and the monocular mode, such that the at least one imaging device operates in either the multi-ocular mode or the monocular mode. The plurality of imaging devices may further comprise a plurality of first imaging devices operably coupled to different sides of the movable object. The second imaging device may be operably coupled to the movable object via a carrier. The second imaging device may be capable of rotating about at least one axis relative to the movable object via the carrier. In some embodiments, the movable object may be an unmanned aerial vehicle (UAV).

In some embodiments, the distance may be determined using one or more proximity sensors and/or the first imaging device. The one or more proximity sensors may comprise ultrasonic sensors, time-of-flight cameras, and/or LIDAR. The distance may be determined using 3-D depth, positional, and/or motion information obtained from one or more stereoscopic images captured by the first imaging device. The distance may be determined based on an altitude of the movable object measured using an onboard barometer and/or one or more proximity sensors.

In some embodiments, the step of selecting may further comprise: comparing the distance to a predefined threshold distance; selecting the first imaging device for acquiring the image data when the distance of each imaging device is equal to or less than the predefined threshold distance; and selecting the second imaging device for acquiring the image data when the distance of each imaging device is greater than the predefined threshold distance. The predefined threshold distance may be obtained from experimental data. The predefined threshold distance may be configured to vary depending on one or more of the following: (1) the environment in which the movable object is operated, (2) a location of the movable object, or (3) an altitude of the movable object.

In some embodiments, the step of selecting may further comprise: comparing the disparity between the matched points to a predefined threshold disparity; selecting the first imaging device for acquiring the image data when the disparity is greater than the predefined threshold disparity; and selecting the second imaging device for acquiring the image data when the disparity is equal to or less than the predefined threshold disparity.

In some embodiments, the predefined threshold disparity may be obtained from experimental data. The predefined threshold disparity may be configured to vary depending on one or more of the following: (1) the environment in which the movable object is operated, (2) weather conditions within the environment, (3) an altitude of the movable object, (4) object density and distribution within the environment, or (5) visual or physical properties of objects located within the environment. In some embodiments, the method may further comprise: calculating one or more motion characteristics of the movable object based on the image data obtained by the first imaging device and/or the second imaging device.

In another aspect of the disclosure, a method of assessing suitability of a plurality of imaging devices onboard a movable object for vision sensing is provided. The method may comprise: obtaining a plurality of observed physical states of the movable object, based on image data collected by the plurality of imaging devices; obtaining a plurality of estimated physical states of the movable object, based on sensor data acquired by an inertial measurement unit (IMU) onboard the movable object; and assessing a suitability of each imaging device for vision sensing, based on a deviation between the observed physical state and the estimated physical state relative to a predetermined threshold.

A system for assessing suitability of a plurality of imaging devices onboard an movable object for vision sensing is provided in another aspect of the disclosure. The system may comprise one or more processors that are configured to: obtain a plurality of observed physical states of the movable object, based on image data collected by the plurality of imaging devices; obtain a plurality of estimated physical states of the movable object, based on sensor data acquired by an inertial measurement unit (IMU) onboard the movable object; and assess a suitability of each imaging device for vision sensing, based on a deviation between the observed physical state and the estimated physical state relative to a predetermined threshold.

A further aspect of the disclosure is directed to a non-transitory computer-readable storage medium with instructions stored thereon that, when executed by a computing system, causes the computing system to perform a method for assessing suitability of a plurality of imaging devices onboard an movable object for vision sensing. The method may comprise: obtaining a plurality of observed physical states of the movable object, based on image data collected by the plurality of imaging devices; obtaining a plurality of estimated physical states of the movable object, based on sensor data acquired by an inertial measurement unit (IMU) onboard the movable object; and assessing a suitability of each imaging device for vision sensing, based on a deviation between the observed physical state and the estimated physical state relative to a predetermined threshold.

In some embodiments, the movable object may be an unmanned aerial vehicle (UAV). The plurality of imaging devices may comprise a plurality of first imaging devices operably coupled to different sides of the movable object, and a second imaging device operably coupled to the movable object via a carrier. The second imaging device may be capable of rotating about at least one axis relative to the movable object via the carrier. In some embodiments, an imaging device from the plurality may be determined to be unsuitable for vision sensing when the deviation for the imaging device is greater than the predetermined threshold.

In some embodiments, the method may comprise assessing which of the plurality of imaging devices are suitable for vision sensing, and which of the plurality of imaging devices are unsuitable for vision sensing. The method may further comprise selecting a first set of imaging devices that are suitable for vision sensing to be operational. The method may further comprise incorporating the observed physical states obtained from the image data collected by the first set of imaging devices, into the corresponding estimated physical states of the movable object. The method may further comprise selecting a second set of imaging devices that are unsuitable for vision sensing to be non-operational, or discarding the image data collected by the second set of imaging devices. The method may further comprise selecting one or more imaging devices from the second set to be operational when the deviation of the one or more imaging devices changes to be equal or less than the predetermined threshold.

In some embodiments, an observed physical state may be obtained from sensor data collected by a GPS sensor onboard the movable object. The method may further comprise assessing the suitability of each imaging device for vision sensing based on the observed physical state obtained from the sensor data collected by the GPS sensor. The observed physical state obtained from the sensor data collected by the GPS sensor may be validated against the estimated physical states of the movable object based on the sensor data acquired by the IMU.

In some embodiments, the predetermined threshold may be configured to vary depending on one or more of the following: (1) an environment in which the movable object operates; (2) one or more motion characteristics of the movable object; (3) a location of the movable object, or (4) an altitude of the movable object. The predetermined threshold may be configured to vary in real-time when (1) motion of the movable object causes it to move from one environment to another environment, (2) the one or more motion characteristics of the movable object changes, (3) the location of the movable object changes, and/or (4) the altitude of the movable object changes. The observed physical states of the movable object may depend on a plurality of different environment types in which the movable object operates. The plurality of different environment types may include distinct characteristics that are based on one or more of the following: (1) weather conditions, (2) object density and distribution, or (3) visual or physical properties of objects located within the different environment types.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
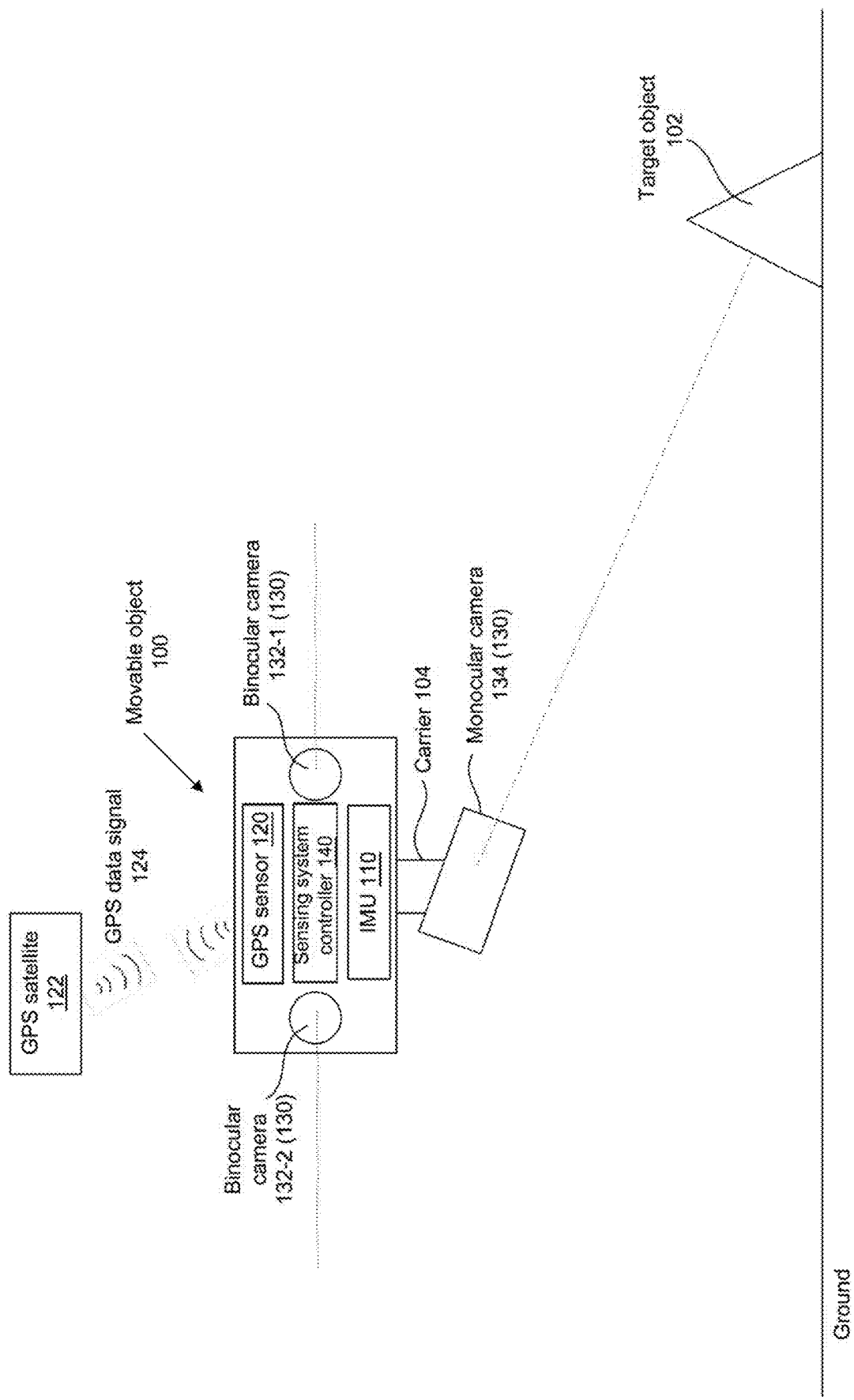
FIG. 1 illustrates a movable object having a plurality of onboard sensing systems, in accordance with some embodiments.

The present disclosure provides methods and systems for collecting positional and/or motion information of a movable object using a plurality of sensors, and for controlling the movable object (e.g., with respect to position, velocity, and/or acceleration). Additionally, the methods and systems can be used to assess the suitability of different sensors and/or data for use in various conditions, such that the movable object can be operated in a safe manner. It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

The embodiments disclosed herein can be applied to any suitable movable object. The movable object can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle or a train), in space (e.g., a spaceplane, a satellite, or a probe), or any combination of these environments. The movable object can be a vehicle, such as an unmanned aerial vehicle (UAV). In some embodiments, the movable object can be disposed on a living subject, such as a human or an animal.

Sensing Systems on Movable Object

A movable object may include one or more sensing systems configured to collect various types of data, such as information relating to the state of the movable object, the surrounding environment, or objects within the environment. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses), pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types).

Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The state information of the movable object can include positional information indicating a three-dimensional (3D) spatial disposition of the movable object relative to a fixed reference frame or a moving reference frame. For example, the positional information can include location information (e.g., altitude, latitude, and/or longitude) and orientation information (e.g., roll angle, pitch angle, and/or yaw angle). Alternatively or in combination, the state information can include motion information regarding translational and/or angular velocity and acceleration of the movable object with respect to one or more of the six degrees of freedom. One or more sensing systems can be configured, for instance, to determine a spatial disposition and/or motion of the movable object with respect to up to six degrees of freedom (e.g., three degrees of freedom in position and/or translation, three degrees of freedom in orientation and/or rotation). In some instances, one or more sensing systems can be configured to determine the distance and/or relative motion between the movable object and one or more objects (e.g., remote controllers, obstacles, surfaces, target objects, etc.) within an environment.

In some embodiments, the data obtained by the sensing systems can provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein. Obstacle information may include information regarding the number, density, geometry, and/or spatial disposition of obstacles in the environment.

In some embodiments, sensing results are generated by combining sensor data obtained by multiple sensors, also known as "sensor fusion." For instance, sensor fusion can be used to combine sensing data obtained by different sensor types, including as GPS sensors, inertial sensors, vision sensors, lidar, ultrasonic sensors, and so on. As another example, sensor fusion can be used to combine different types of sensing data, such as absolute measurement data (e.g., data provided relative to a global coordinate system such as GPS data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the final sensing result.

In some embodiments, a sensing system controller as disclosed herein can be configured to process the sensing data from a plurality of sensing systems, and select which sensing system(s) and/or data to utilize for determining a state of the movable object. The sensing system controller can be located onboard or remote from the movable object. The sensing data collected by the selected sensing system(s) can be provided to a flight controller. The flight controller can be configured to control, via one or more electronic speed control (ESC) units, one or more propulsion units of the movable object to effect motion based on the sensing data. For example, the sensing data provided by the selected sensing systems can be used to control the spatial disposition, velocity, and/or orientation of the movable object (e.g., using a suitable processing unit and/or control module, as described elsewhere herein). Additionally, the sensing systems can be used to provide data regarding the environment surrounding the movable object, such as weather conditions, proximity to potential obstacles, location of geographical features, location of manmade structures, and the like, as described above.

Motion and/or Position Estimation Using Sensor Fusion

In some instances, the performance of an individual sensing system can be less than ideal. For example, GPS sensing systems require line of sight to a plurality of GPS satellites, and can therefore be limited when used in poor weather conditions, indoor environments, or near buildings. Additionally, although DGPS and RTK GPS demonstrate improved accuracy compared to conventional GPS, these technologies can be associated with various restrictions that limit their applicability in some instances. Vision sensing systems, for example, can require significant amounts of computation. Furthermore, the accuracy of vision sensing systems can be influenced by image quality, such that low image resolution, image blurring (e.g., due to rapid movement), and image distortion can reduce the performance of such systems. Proximity sensing systems, for example, can be limited by sensor accuracy and usage range, as long range sensors can be too large for use in some applications. Additionally, lidar sensors can exhibit reduced performance under strong sunlight conditions.

In order to reduce measurement inaccuracies caused by any potential shortcomings of a single sensing system, the state (spatial disposition and/or motion) of the movable object can be determined based on data received from selected sensing systems that are determined to have valid or accurate data. The sensing system controller disclosed herein can make this determination by cross-checking the validity of sensing data from different sensing systems, and assessing whether to fuse the sensing data based on their validity. The sensing system controller can selectively activate and/or operate different sensing systems for different environment types. The different sensing systems can represent different types of sensors as described herein (e.g., IMU, GPS, or vision sensors). For example, a first sensing system can include an IMU, a second sensing system can include a GPS sensor, and a third sensing system can include a vision sensor. In some alternative embodiments, the different sensing systems can include the same or similar type of sensors, but arranged in different configurations. As an example, a first sensing system can include sensors that are configured for use in an outdoor environment, a second sensing system can include sensors that are configured for use in an indoor environment, a third sensing system can include sensors that are configured for use in a high altitude environment and so forth. The different sensing systems may or may not include overlapping sensors (e.g., sensors that are common and used in two or more different sensing systems). Additionally, the sensing system controller can smoothly switch from one sensing system to another (or between sensors within a single sensing system) depending on the validity of the sensing data and/or the environment in which the movable object is operated. Accordingly, the sensor fusion techniques described herein make use of the advantages of selective sensing while compensating for measurement inaccuracies or malfunctions from any single sensing system. The sensor fusion may utilize data from only a subset of the sensing systems. This approach may be advantageous in order to omit inadequate or unreliable sensor data (e.g., GPS sensing data when the movable object is indoors, or vision sensing data when the movable object is moving over an area that has few distinguishing visual features). Consequently, improved estimates of the motion and/or position of the movable object can be achieved in a wide variety of environments.

Any suitable number and type of sensing systems can be used for the sensor fusion methods described herein. For example, a three-way sensor fusion of a GPS sensing system, an IMU sensing system, and a vision sensing system, can be performed. Alternatively, a two-way sensor fusion can be performed (e.g., GPS and IMU, GPS and vision, GPS and proximity, IMU and vision, IMU and proximity, or vision and proximity). Alternatively, data received from a plurality of sensing systems can be sequentially fused over multiple sensor fusion steps in any suitable order (e.g., GPS is fused with IMU, then vision is fused with GPS and IMU). The methods for sensor fusion described herein can be applied to determine positional and/or motion information for any suitable movable object, such as embodiments of the systems and devices described herein.

FIG. 1 illustrates a movable object 100 having a plurality of onboard sensing systems, in accordance with some embodiments. In some embodiments, the movable object may be a vehicle such as an unmanned aerial vehicle. The plurality of sensing systems can include an inertial measurement unit (IMU) 110, a GPS sensor 120, and/or one or more vision sensors 130. The data collected by the sensing systems can be used to obtain positional and/or motion information, that can be used to control and/or navigate the movable object. The plurality of sensing systems are in operable communication with a sensing system controller 140 onboard the movable object. Alternatively, the sensing system controller may be remote from the movable object. The sensing system controller may include one or more processors. The sensing system controller may employ a multi-thread hierarchical decision algorithm for selecting which of the sensing system(s) and/or sensing data to utilize under various conditions, as described in detail elsewhere herein. The algorithm can be implemented using a combination of software and/or hardware. Examples of the various conditions may include sensor malfunction, inaccuracies or deviations in sensing data, different types of environments in which the movable object operates, etc.

The IMU 110 may include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU can be rigidly coupled to the movable object such that the motion of the movable object corresponds to motion of the IMU. Alternatively, the IMU can be permitted to move relative to the movable object with respect to up to six degrees of freedom. The IMU can be directly mounted onto the movable object, or coupled to a support structure mounted onto the movable object. The IMU may be provided exterior to or within a housing of the movable object. The IMU may be permanently or removably attached to the movable object. In some embodiments, the IMU can be an element of a payload of the movable object. The IMU can provide a signal indicative of the motion of the movable object, such as a position, orientation, velocity, and/or acceleration of the movable object (e.g., with respect to one, two, or three axes of translation, and/or one, two, or three axes of rotation). For example, the IMU can sense a signal representative of the acceleration of the movable object, and the signal can be integrated once to provide velocity information, and twice to provide location and/or orientation information.

The GPS sensor 120 can communicate with one or more GPS satellites 122 to obtain one or more GPS data signals 124. The GPS sensor can be rigidly coupled to the movable object such that the position of the GPS sensor corresponds to the position of the movable object. Alternatively, the GPS sensor can be permitted to move relative to the movable object with respect to up to six degrees of freedom. The GPS sensor can be directly mounted onto the movable object, or coupled to a support structure mounted onto the movable object. In some instances, the support structure may include a load, such as a carrier or payload. The GPS sensor may be provided exterior to or within a housing of the movable object. The GPS sensor may be permanently or removably attached to the movable object. In some embodiments, the GPS sensor can be an element of a payload of the movable object.

The GPS signals received by the GPS sensor can be processed to determine the position of the movable object relative to a global reference frame (e.g., latitude, longitude, and altitude), and that can be used to determine the translational velocity and/or acceleration of the movable object. The GPS sensor can utilize any suitable GPS technology, such as differential GPS (DGPS) or real time kinematic (RTK) GPS. The GPS sensor can be configured to determine the position of the movable object to any suitable level of accuracy, such as meter-level accuracy (e.g., within 10 m, 5 m, 2 m, or 1 m of accuracy) or centimeter-level accuracy (within 500 cm, 200 cm, 100 cm, 50 cm, 20 cm, 10 cm, or 5 cm of accuracy).

The vision sensors 130 can be any suitable device for collecting optical signals of the surrounding environment, that can be processed to generate image data of the surrounding environment or of a target object (e.g., target object 102). Any suitable number of vision sensors can be used, such as a single vision sensor, a pair of vision sensors, three vision sensors, four vision sensors, or any other number of vision sensors. A vision sensor as used herein may be referred to interchangeably as a camera or an imaging device. In some cases, a vision sensor can be an optical component of a camera or an imaging device. The vision sensors may be part of different imaging devices that are capable of operating in different modes. For example, the vision sensors may be part of one or more monocular cameras and/or multi-ocular cameras.

In some embodiments, the imaging devices may include at least one imaging device that is configured to operate in a monocular mode, and at least one imaging device that is configured to operate in a multi-ocular mode. In some embodiments, a single imaging device may be configured to operate and switch between two or more imaging modes, which may include a monocular mode and a multi-ocular mode. As an example, an imaging device may be configured to operate in the monocular mode in one instance, and operate in the multi-ocular mode in another instance. A multi-ocular mode may include a binocular mode (or stereo mode).

For example, as shown in FIG. 1, the imaging devices may include binocular cameras 132-1 and 132-2 each including a pair of vision sensors (not shown). The pair of vision sensors can be laterally spaced apart on the movable object such that each vision sensor provides an image from a different camera viewpoint, thereby enabling stereo vision imaging. For example, the vision sensors can be separated laterally by up to 1 m, 500 cm, 250 cm, 100 cm, 50 cm, 25 cm, 10 cm, 5 cm, 2 cm, or 1 cm. The binocular cameras can be disposed on the same side of the movable object or opposite sides of the movable object. One or more binocular cameras can be disposed on the front, rear, top, bottom, or lateral sides of the movable object, or suitable combinations thereof. The binocular cameras can be rigidly coupled to the movable object, such that the positional information obtained by the binocular cameras corresponds to the positional information of the movable object. Alternatively, the binocular cameras may be operably coupled to the movable object via one or more carriers, that permit the binocular cameras to move relative to the movable object with respect to up to six degrees of freedom.

In some embodiments, the imaging devices may include a monocular camera 134 comprising a single vision sensor. The monocular camera 134 can be operably coupled to the movable object via a carrier 104, that permits the monocular camera to move relative to the movable object with respect to up to six degrees of freedom. Alternatively, the monocular camera can be directly mounted onto the movable object, or coupled to a support structure mounted onto the movable object. In some embodiments, the monocular camera can be an element of a payload of the movable object. In some embodiments, the monocular camera 134 can be configured to capture image data of a target object 102 in the environment.

The vision sensors 130 can be used to simultaneously capture images at a specified frequency to produce a time series of image data. The time series of image data obtained from the vision sensors can be processed to determine the position, orientation, and/or velocity of the movable object using any suitable method, such as a machine vision algorithm. For example, a machine vision algorithm can be used to identify one or more feature points within each image (e.g., an edge of an object, a corner of an object, or a boundary between objects of two different colors). Any suitable method or combination of methods can be used to identify and provide a digital representation of the feature points, such as the features from accelerated segment test (FAST) algorithm or the binary robust independent elementary features (BRIEF) algorithm. The image data can then be matched to each other to identify a set of common feature points appearing in images obtained by both vision sensors. The motion of the movable object can be determined based on the common feature points and the spatial disposition of the vision sensors relative to the movable object and to each other.

Although not depicted in FIG. 1, the movable object 100 can also include a proximity sensing system configured to provide positional information for the movable object. Any proximity sensor capable of measuring the distance between the movable object and one or more surrounding objects can be used. For example, the proximity sensing system can include an ultrasonic sensor and/or a lidar sensor. In some embodiments, the proximity sensor can be rotated (e.g., rotated 360°) to obtain distance and position information for a plurality of objects surrounding the movable object. The distance and position information for the surrounding objects can be analyzed to determine the spatial disposition and/or motion of the movable object.

Figure 2:
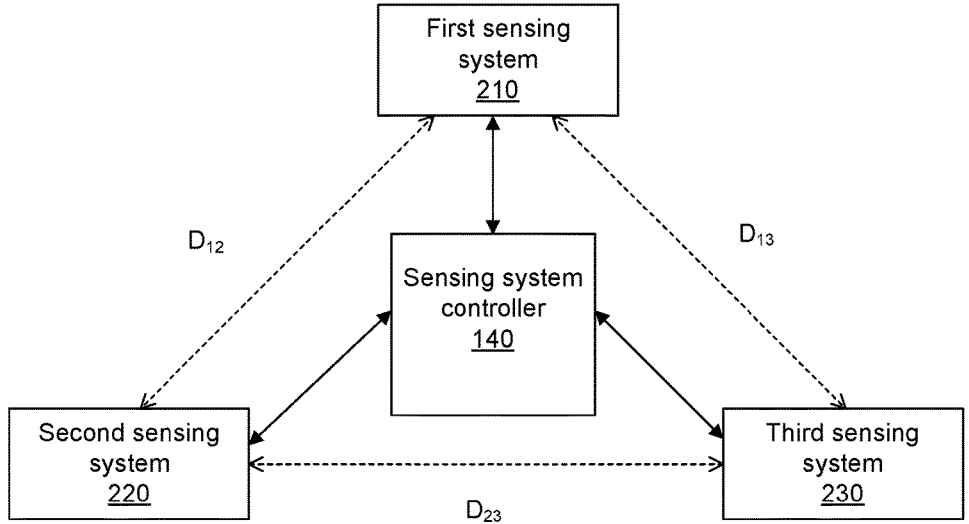
FIG. 2 illustrates a sensing system controller in communication with a plurality of sensing systems, in accordance with some embodiments.
Figure 2:
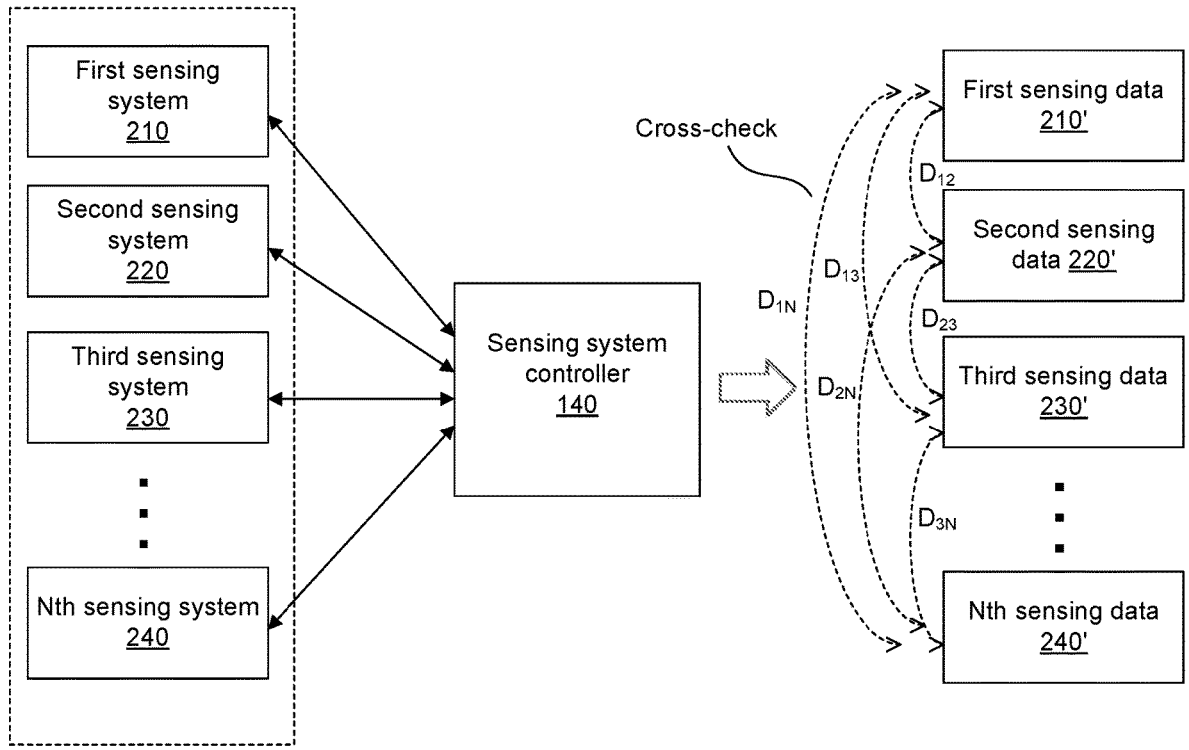

FIG. 2 illustrates a sensing system controller in communication with a plurality of sensing systems, in accordance with some embodiments. The sensing system controller may be operably connected to two or more sensing systems. For example, part A of FIG. 2 shows the sensing system controller in communication with three sensing systems, and part B shows the sensing system controller in communication with N of sensing systems, where N can be any integer greater than three. The sensing system controller can comprise one or more processors that are configured to obtain sensing data collected from a plurality of sensing systems coupled to a movable object (e.g., movable object 100). The sensing system controller can be configured to determine a state of the movable object based on the sensing data. The state of the movable object may correspond to its physical state, which can be represented by a set of positional information and/or motion information of the movable object. The positional information of the movable object may include a location and/or orientation of the movable object. The motion information of the movable object may include a linear velocity, angular velocity, linear acceleration, and/or angular acceleration of the movable object.

In some embodiments, the sensing system controller can employ a multi-thread hierarchical decision algorithm to cross-check the validity of the data from the different sensing systems with respect to one another, in order to select which sensors and/or data to utilize under various conditions. Multi-thread as used herein can refer to multiple threads of sensor fusion decision-making executing concurrently along different paths of a same decision tree. The decision-making process can be implemented using software and hardware for multi-threaded programming, parallel computing, multicore processors, etc. For example, the process can be implemented as a decision algorithm that determines which sets of sensor data to fuse, when/where to fuse, for different environments and under different operating conditions. The sensor fusion decision-making process can also proceed in a hierarchical manner. For example, the decision-making process can begin by first evaluating data from two or more sensing systems, followed by data from another two or more sensing systems. The data evaluation may proceed in a sequential manner, round-robin manner, or concurrently as and when sensor data becomes available. The hierarchical manner may also proceed based on an ordering between different sensing systems (or different sensing nodes). For example, the algorithm can be represented or modeled in a graph-like structure with nodes and edges, where nodes represent sensor data from different sensing systems, and edges represent the sensor fusion decision path. Examples of the graph-like structure can include a decision tree, decision flowchart, etc.

The cross-checking and validation of sensor data introduces an additional layer of redundancy, that can improve the operational safety factor/margin of the movable object. Various embodiments directed to sensing data cross-checking and sensor selection are next described.

Referring to part A of FIG. 2, the plurality of sensors described above can include a first sensing system 210, a second sensing system 220, and a third sensing system 230. The first sensing system 210 can comprise an IMU including at least one accelerometer and/or gyroscope. In some embodiments, the second sensing system 220 can comprise a GPS receiver onboard the movable object. In some other embodiments, the second sensing system 220 may comprise one or more vision sensors coupled to different portions of the movable object. In some embodiments, when the second sensing system 220 comprises a GPS receiver, the third sensing system 230 may comprise one or more vision sensors. Alternatively, when the second sensing system 220 comprises one or more vision sensors, the third sensing system 230 may comprise a GPS receiver. Any order or configuration of the first, second, third, to Nth sensing systems 240 (see part B of FIG. 2) may be contemplated. One or more vision sensors can be coupled to different portions of the movable object. In some embodiments, the vision sensors can comprise at least one binocular camera and/or at least one monocular camera. A binocular camera may be referred to interchangeably as a stereo vision camera.

The sensing systems 210, 220, 230 can be configured to collect data at the same sampling frequency or at different sampling frequencies. For example, the first sensing system can be configured to collect data at a substantially higher sampling frequency than the second and third sensing systems. In some embodiments, a sampling frequency of the first sensing system may range from about 200 Hz to about 400 Hz, a sampling frequency of the second sensing system may range from about 5 Hz to about 10 Hz, and a sampling frequency of the third sensing system may range from about 10 Hz to about 100 Hz. In some instances, the IMU can be configured to collect inertial sensing data at about 200 Hz, the GPS receiver can be configured to receive GPS data at about 10 Hz, and the vision sensors can be configured to acquire image data at about 50 Hz. Since the second and third sensing systems have lower sampling frequencies than the first sensing system, there will be instances during which data is being acquired by the first sensing system, but in which data from the second and third sensing systems is unavailable or has not yet been updated.

The sensing system controller 140 can be configured to cross-check the validity of the sensing data between multiple sensing systems. For example, the sensing system controller can calculate deviations between the sensing data acquired by different sensing systems. In some embodiments, the sensing system controller can calculate a deviation $D_{12}$ between the sensing data collected by the first and second sensing systems, a deviation $D_{13}$ between the sensing data collected by the first and third sensing systems, and/or a deviation $D_{23}$ between the sensing data collected by the second and third sensing systems. The cross-checking between different sensing systems can be extended to N sensing systems and N different sets of sensing data, for example as shown in part B of FIG. 2. The cross-checking can be performed in any configuration, for example between 1:N sensing systems or N:N sensing systems. In some embodiments, there may be N sensing systems available, but the cross-checking need not be conducted across all N sensing systems. This can reduce the amount of computational resources required for the cross-checking. Also, it can reduce power consumption and improve response time of the sensor fusion decision-making process, if only certain subsets of the sensing systems are selected for cross-checking. For example, the cross-checking can be conducted for a subset of the N sensing systems, such as x:y sensing systems where x and y can any integer that is less than N. In some embodiments, x may be equal to y. Alternatively, x need not be equal to y, and can be less than or greater than y.

The deviation $D_{12}$ is a measure of dissimilarity between the sensing data acquired by the first and second sensing systems. In some embodiments, the deviation $D_{12}$ is indicative of a validity of the sensing data of the second sensing system relative to the first sensing system. Similarly, the deviation $D_{13}$ is a measure of dissimilarity between the sensing data acquired by the first and third sensing systems. In some embodiments, the deviation $D_{13}$ is indicative of a validity of the sensing data of the third sensing system relative to the first sensing system. Likewise, the deviation $D_{23}$ may be a measure of dissimilarity between the sensing data acquired by the second and third sensing systems. In some embodiments, the deviation $D_{23}$ is indicative of a validity of the sensing data of the third sensing system relative to the second sensing system.

Figure 3:
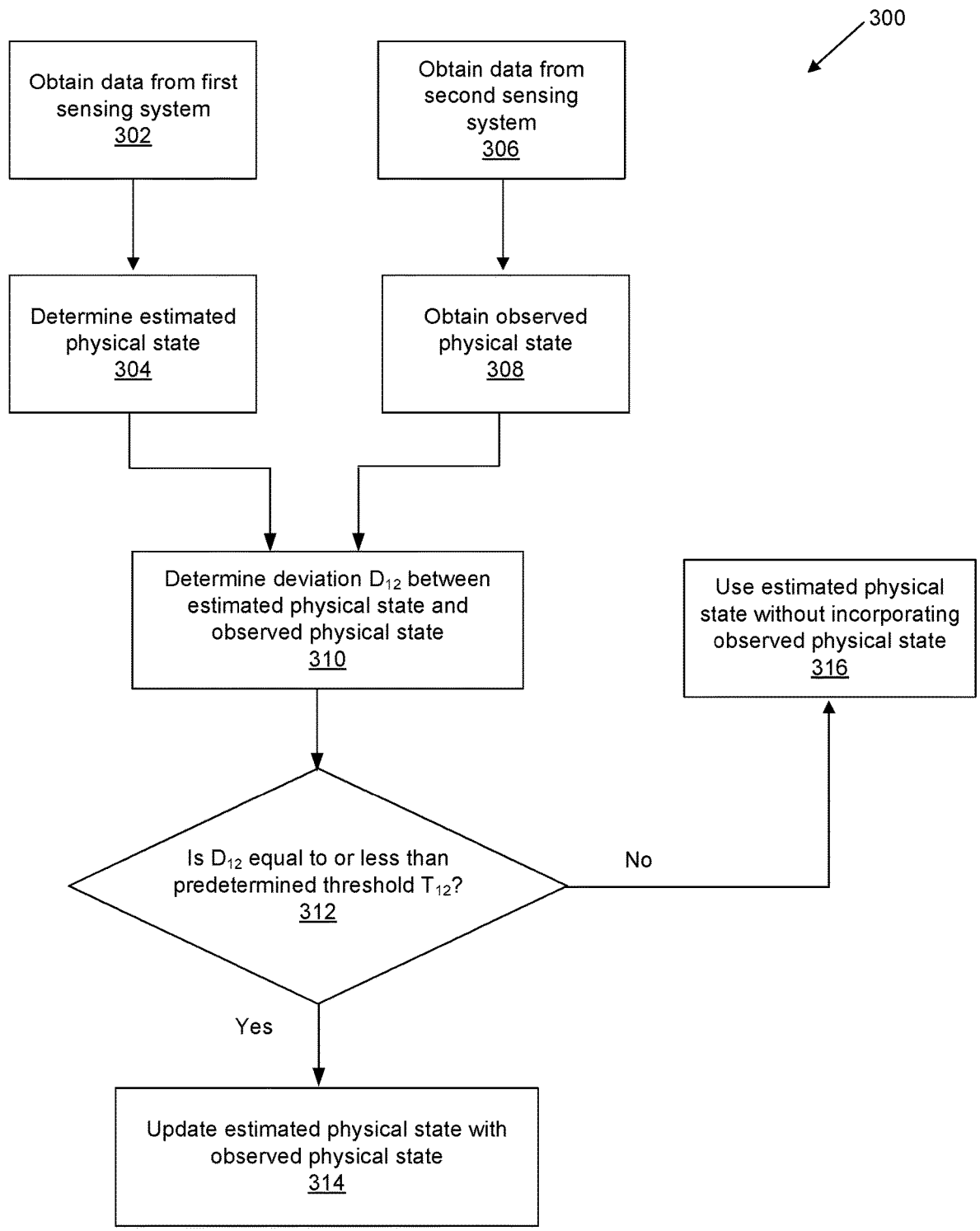
FIG. 3 illustrates a method for determining a physical state of a movable object having two sensing systems, in accordance with some embodiments.

FIG. 3 illustrates a method for determining a physical state of a movable object, in accordance with some embodiments. The physical state may include positional and/or motion information of the movable object. The method 300 can be performed by the sensing system controller described elsewhere herein. The sensing system controller can be configured to obtain sensing data from a first sensing system and a second sensing system. The first sensing system can be configured to collect sensing data at a first sampling frequency, and the second sensing system can be configured to collect sensing data at a second sampling frequency. In some embodiments, the first sensing system may be an IMU onboard the movable object. The first sampling frequency may be higher than the second sampling frequency, for example as shown in FIG. 4.

The sensing system controller can be configured to obtain sensing data from the first sensing system (step 302). The sensing system controller can determine, using the sensing data of the first sensing system, an estimated physical state of the movable object during a time duration when the sensor data of the second sensing system is unavailable, not updated, unreliable, or otherwise unusable (step 304). Additionally or alternatively, the sensing system controller can determine, using the sensing data of the first sensing system, an estimated physical state of the movable object during a time duration when the sensor data of the second sensing system is available. The sampling of both sets of sensor data (from the first and second sensing systems) may or may not overlap, depending on the sampling frequencies. Referring to FIG. 4, the sensing data of the second sensing system is unavailable or is not updated during the time durations t1<t<t2 and t2<t<t3. During those time durations, the sensing system controller can determine the estimated physical state of the movable object, by extrapolating one or more previously-determined physical states derived from the sensing data of the first sensing system.

Figure 4:
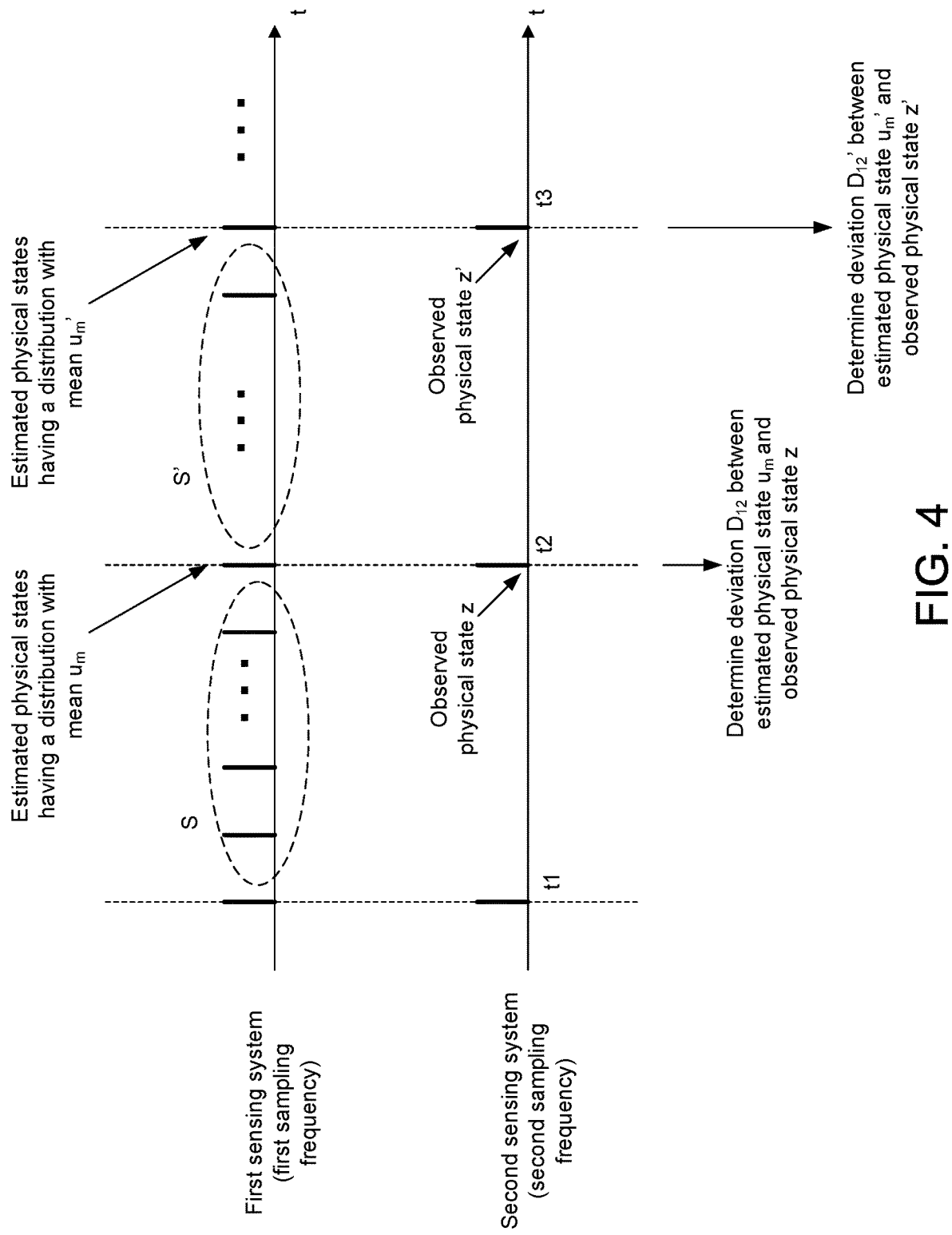
FIG. 4 illustrates different periodic sampling frequencies of the two sensing systems of FIG. 3, in accordance with some embodiments.

As shown in FIG. 4, the sensing data from the second sensing system becomes available or is updated at specific intervals (at times t1, t2, t3 and so forth). The sensing system controller can obtain sensing data from the second sensing system when the data becomes available or is updated (step 306). For example, the sensing system controller can obtain sensing data from the second sensing system within a time delay after the second sensing system has acquired the sensing data. The time delay may range, for example from 0.001 sec to about 0.1 sec, less than 0.001 sec, or greater than 0.1 sec. The sensing system controller can obtain, from the sensing data of the second sensing system, an observed physical state of the movable object (step 308).

The observed physical state of the movable object may include, for example, physical states as obtained from GPS or vision sensor data. The estimated physical state of the movable object may be calculated (e.g., extrapolated or derived) based on IMU sensor data. As shown in FIG. 4, observed physical states of the movable object can be obtained from the data of the second sensing system at times t1, t2, t3 and so forth. In some embodiments, the second sensing system may comprise a GPS sensor, and the GPS data becomes available or is updated when the GPS sensor on the movable object receives GPS signals from two or more satellites, e.g., from at least three satellites. In other embodiments, the second sensing system may comprise one or more vision sensors, and the vision data becomes available or is updated as images are being captured.

Referring to FIGS. 3 and 4, each time the data from the second sensing system (for example, GPS data) becomes available or is updated, the sensing system controller is configured to perform a check on the newly available or newly updated sensing data from the second sensing system. The check comprises determining a deviation $D_{12}$ between the estimated physical state and the observed physical state of the movable object (step 310). The deviation $D_{12}$ is a measure of dissimilarity between the first observed physical state and the estimated physical state. The deviation $D_{12}$ can also be indicative of a validity of the sensing data of the second sensing system, as previously described.

The deviation $D_{12}$ can be determined using one or more statistical methods. In some embodiments, the deviation $D_{12}$ can be a Mahalanobis distance calculated between the first observed physical state and the estimated physical state. The Mahalanobis distance is calculated by comparing the first observed physical state to a distribution of estimated physical states. The distribution may comprise a set of estimated physical states that are determined based on a priori estimated physical states. The a priori estimated physical states may be determined for those time duration(s) during which data from the second sensing system is unavailable or is not updated. Referring to FIG. 4, the Mahalanobis distance can be calculated each time the data from the second sensing system becomes available or is updated. For example, at time t1, the Mahalanobis distance is a measure of the distance (number of standard deviations) between a first observed physical state (at point z) and the mean $\mu_m$ of a distribution having a plurality of estimated physical states $\mu$. The distribution may be based on a priori estimated physical states S that are determined during time duration t1<t<t2. The mean $\mu_m$ may correspond to an estimated state or predicted state of the movable object at time t2. The point z may correspond to the observed state of the movable object at time t2 based on data from the second sensing system. The Mahalanobis distance is zero if the point z is at mean $\mu_m$, and increases as the point z moves away from the mean $\mu_m$. Accordingly, the Mahalanobis distance is a measure of the dissimilarity of the observed state from the second sensing system, relative to the estimated/predicted state from the first sensing system. It is noted that other types of metrics can also be used as a measure of dissimilarity between the first observed physical state and the estimated physical state. In some embodiments, the deviation $D_{12}$ can be provided as a Euclidean distance instead of a Mahalanobis distance. For example, a Euclidean distance may be used when the covariance matrix between the observed and estimated states is an identity matrix.

The Mahalanobis distance, and the covariance matrix between the observed and estimated states, can be updated in real-time as data from the second sensing system becomes available or is updated. For example, at time t3 shown in FIG. 4, the Mahalanobis distance is a measure of the distance (number of standard deviations) between another observed physical state (at point z') and the mean $\mu_m'$ of a distribution having estimated physical states $\mu'$. The distribution may be based on a priori estimated physical states S' that are determined during time duration t2<t<t3. In some embodiments, the distribution may be based on one or more a priori estimated physical states determined during time duration t1<t<t3.

A Mahalanobis distance $D_M$ can be calculated using the following equation:

$$D_M(z_k) = \sqrt{(z_k - C_k \bar{\mu}_k)^T \Sigma_k^{-1} (z_k - C_k \bar{\mu}_k)}$$

where $z_k$ corresponds to the first observed physical state, $C_k$ is a constant, $\bar{\mu}_k$ is the mean of a distribution of estimated physical states $\mu$, and $\Sigma_k^{-1}$ is the covariance matrix of the distribution, and k corresponds to one or more time points at which data from the second sensing system becomes available or is updated.

Referring back to FIG. 3, the sensing system controller can be configured to compare the deviation $D_{12}$ to a predetermined threshold $T_{12}$, and determine whether to update the estimated physical state with the observed physical state based on the comparison result (step 312). If the deviation $D_{12}$ is equal to or less than the predetermined threshold $T_{12}$, the sensing system controller then determines a physical state of the movable object based on the estimated physical state and the observed physical state. The physical state of the movable object can be determined by updating the estimated physical state to incorporate the observed physical state (step 314). This can be achieved, for example, by fusing the estimated physical state with the first observed physical state using any appropriate sensor fusion techniques. The sensor fusion techniques can include an algorithm based on a Kalman filter, an extended Kalman filter (EKF), an unscented Kalman filter (UKF), a particle filter (PF), or suitable combinations thereof.

In some embodiments, the sensing system controller can exclude sensing data from the second sensing system from the sensor fusion analysis. For example, if the deviation $D_{12}$ is greater than the predetermined threshold $T_{12}$, the sensing system controller then determines the physical state of the UAV without using the observed physical state (step 316). In those cases, the sensing system controller can determine the physical state of the UAV using only the estimated physical state from the first sensing system, for example by selecting the estimated physical state to be the physical state of the UAV. In some instances, the sensing system controller can be configured to discard the sensing data containing the observed physical state, if the deviation $D_{12}$ is greater than the predetermined threshold $T_{12}$.

In some embodiments, if the deviation $D_{12}$ exceeds the predetermined threshold $T_{12}$, this may indicate that the second sensing system is behaving abnormally. For example, the sensors in the second sensing system may have drifted from their initial calibrated configuration. In some cases, the predetermined threshold $T_{12}$ can be defined as one, two, three, four or more standard deviations away from the mean of a distribution of the estimated physical state. The predetermined threshold $T_{12}$ may be a uniform value applied to all of the sensors within the second sensing system. Alternatively, the predetermined threshold $T_{12}$ may vary for each sensor within the second sensing system. The predetermined threshold $T_{12}$ may be fixed or it may vary with respect to an independent variable, for example time or distance traveled by the movable object. Any description relating to the deviation $D_{12}$ and the predetermined threshold $T_{12}$ may also apply to other deviations and predetermined thresholds as described elsewhere herein.

Kalman Filter for IMU (First Sensing System) and GPS (Second Sensing System)

The method of FIGS. 3 and 4 is next described using an example in which the first sensing system comprises an IMU and the second sensing system comprises a GPS sensor. The GPS sensor is capable of maintaining a state of its own $[p_x, p_y, v_x, v_y]^T$. The data in the z-direction is not estimated due to inaccuracies in the z-direction of GPS sensor. To fuse the IMU data with GPS data, the acceleration data from the IMU is used as input to the sensing system controller, and the position and velocity data from the GPS sensor is used as observations. The continuous system equation and observation equation are obtained as $\dot{x} = Ax + Bu + \varepsilon$ $z = Cx + \delta$ In the above equations, the state vector $x = [p_x, p_y, v_x, v_y]^T$, $[p_x, p_y]^T$, is the horizontal position of the movable object, $[v_x, v_y]^T$, is the horizontal velocity of the movable object, the control vector $$u = R_i^w \begin{bmatrix} a_x \\ a_y \\ a_z \end{bmatrix} - \begin{bmatrix} 0 \\ 0 \\ g \end{bmatrix},$$

g is the gravitational acceleration, $R_i^w$ is a rotation from IMU reference frame to world coordinates and can be obtained from the IMU with a compass. The acceleration information along a horizontal direction is used, without accounting for acceleration information along a vertical direction (in the direction of gravity). The GPS observation vector $x = [p_{x\_gps}, p_{y\_gps}, v_{x\_gps}, v_{y\_gps}]^T$, system matrix A, input matrix B and observation matrix C, are provided as follows:

$$A = \begin{bmatrix} 0 & 0 & 1 & 0 \\ 0 & 0 & 0 & 1 \\ 0 & 0 & 0 & 0 \\ 0 & 0 & 0 & 0 \end{bmatrix}, B = \begin{bmatrix} 0 & 0 \\ 0 & 0 \\ 1 & 0 \\ 0 & 1 \end{bmatrix}, C = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

The above is discretized according to linear time-invariant continuous system principles. The discretization is a process that describes the dynamic characteristics of the movable object, such that the observation equation (which is a static equation) remains unchanged after the discretization process. The discretized system equation is given by:

$x_k = Gx_{k-1} + Hu_k$ $$G = e^{AT} = \begin{bmatrix} 1 & 0 & T & 0 \\ 0 & 1 & 0 & T \\ 0 & 0 & 1 & 0 \\ 0 & 0 & 0 & 1 \end{bmatrix}$$

$$H = \left( \int_0^T e^{AT} dt \right) B = \begin{bmatrix} T^2/2 & 0 \\ 0 & T^2/2 \\ T & 0 \\ 0 & T \end{bmatrix}$$

In the above equation, T is the sampling time. For instance, if the sampling frequency of an accelerometer in the IMU is 1000 Hz, then T=0.001 s. As previously described, the sampling frequency of the IMU may be substantially higher than that of the GPS sensor. For example, the sampling frequency of the IMU may one, two, three or more orders of magnitude higher than the sampling frequency of the GPS sensor. Prior to the GPS data becoming available, the IMU data can be used to predict the state of the movable object and covariance. The state of the movable object is updated with the GPS observations only when the GPS data is available and stable. As previously described, the state is updated only when the deviation between the GPS observed state and the IMU estimated state is equal to or less than a predetermined threshold.

In applying a Kalman filter to IMU and GPS sensing data, each time the GPS data becomes available or is updated, a check on the new GPS data can be performed using the method described in FIGS. 3 and 4. The deviation (e.g., a Mahalanobis distance or a Euclidean distance) can be calculated between the estimated physical state (from IMU data) and the observed physical state (from GPS data). If the deviation is equal to or less than the predetermined threshold, then the GPS data may be determined to be accurate (or valid). Conversely, if the deviation is greater than the predetermined threshold, then the GPS data may be determined to be inaccurate (or invalid). Accordingly, the IMU data can be used to cross-check the validity of GPS data at different time points using the above steps.

Kalman Filter for IMU (First Sensing System) and Vision Sensors (Second Sensing System)

The method of FIGS. 3 and 4 is next described using an example in which the first sensing system comprises an IMU and the second sensing system comprises a plurality of vision sensors. The plurality of vision sensors may include binocular cameras that are disposed on different sides (e.g., front, rear, top, bottom, and/or lateral) of the movable object. The sampling frequency of the IMU may be substantially higher than that of the vision sensors. For example, the sampling frequency of the IMU may one, two, three or more orders of magnitude higher than the sampling frequency of the vision sensors. Prior to the vision sensing data becoming available, the IMU data can be used to predict the state of the movable object as follows:

System state $x=[p_x,p_y,v_x,v_y,v_z]^T$

The output of the vision sensors may include an observation to an initial key frame.

$$\begin{bmatrix} P \\ V \end{bmatrix}_k = \begin{bmatrix} I_{3\times3} & TI_{3\times3} \\ 0_{3\times3} & I_{3\times3} \end{bmatrix} \begin{bmatrix} P \\ V \end{bmatrix}_{k-1} + \begin{bmatrix} \frac{T^2}{2}I_{3\times3} \\ TI_{3\times3} \end{bmatrix} \left( R_i^w \begin{bmatrix} a_x \\ a_y \\ a_z \end{bmatrix} - \begin{bmatrix} 0 \\ 0 \\ g \end{bmatrix} \right)_k$$

$$Z_1 = [\, I_{3\times3} \quad 0_{3\times3}\,][\, P \quad V\,]^T$$

$$Z_2 = [\, I_{3\times3} \quad 0_{3\times3}\,][\, P \quad V\,]^T$$

$$Z_3 = [\, I_{3\times3} \quad 0_{3\times3}\,][\, P \quad V\,]^T$$

If the movable object comprises N binocular cameras mounted to different portions of the movable object, the system equation may be updated N times. The state of the movable object is updated with the vision observations only when the vision observations are available and stable. As previously described, the state is updated only when the deviation between the observed physical state (from vision sensing data) and the estimated physical state (from IMU data) is equal to or less than a predetermined threshold.

In applying a Kalman filter to IMU and vision sensing data, each time the vision data becomes available or is updated, a check on the new vision data can be performed using the method described in FIGS. 3 and 4. The deviation (e.g., a Mahalanobis distance or a Euclidean distance) can be calculated between the estimated physical state (from IMU data) and the first observed physical state (from vision data). If the deviation is equal to or less than the predetermined threshold, then the vision data is determined to be accurate (or valid). Conversely, if the deviation is greater than the predetermined threshold, then the vision data is determined to be inaccurate (or invalid). Accordingly, the IMU data can be used to cross-check the validity of vision data using the above steps.

Figure 5:
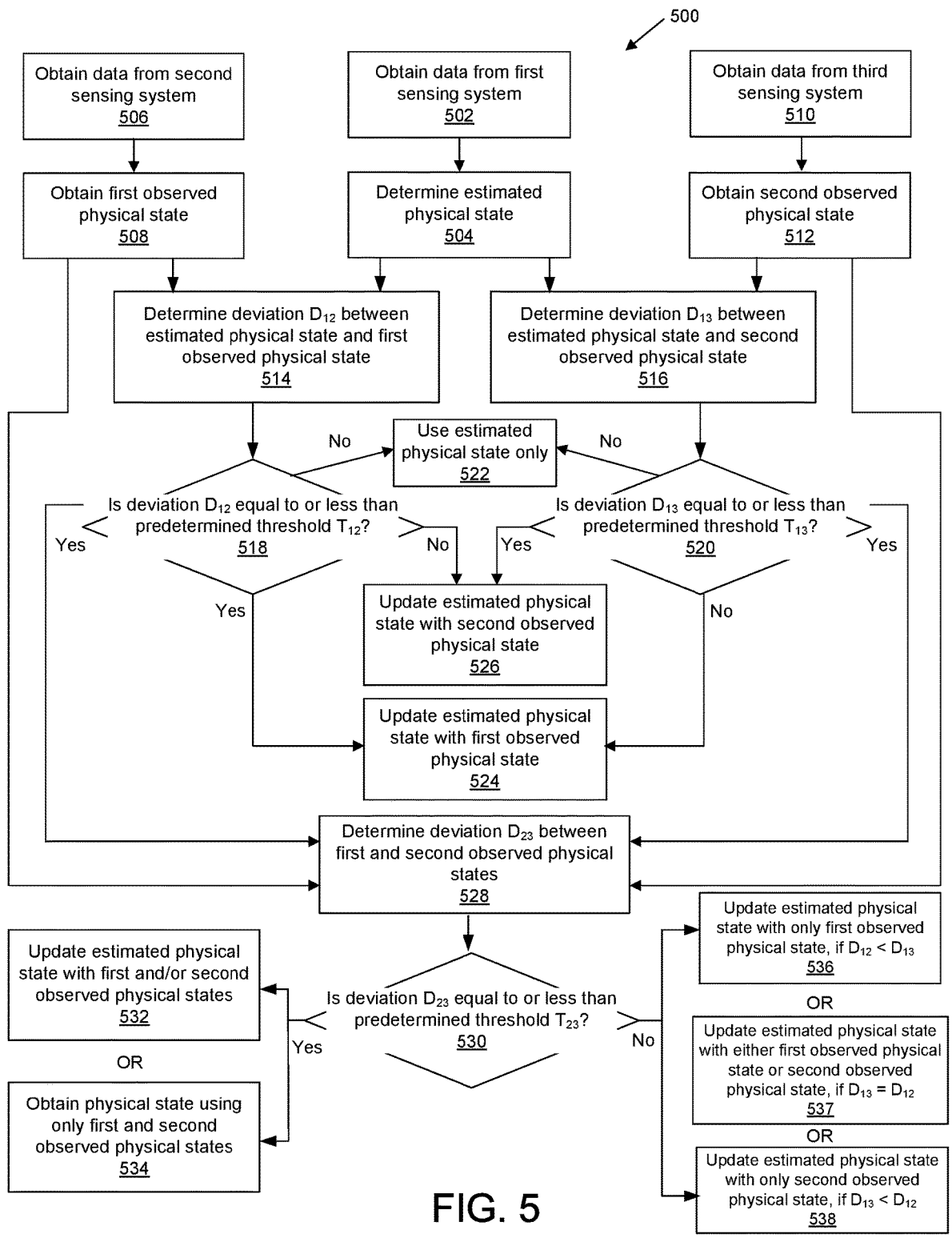
FIG. 5 illustrates a method for determining a physical state of a movable object having three sensing systems, in accordance with some embodiments.

FIG. 5 illustrates a method for determining a physical state of a movable object, in accordance with some embodiments. The method 500 can be performed by the sensing system controller described elsewhere herein (e.g., sensing system controller 140 of FIG. 2). Method 500 is similar to method 300 of FIG. 3 except for the following differences. In FIG. 5, the sensing system controller is further configured to obtain sensing data from a third sensing system. The third sensing system may have a different sampling frequency than the first sensing system. For example, the third sensing system may have a lower sampling frequency than the first sensing system. In some embodiments, the sampling frequency of the third sensing system may be one, two, three or more orders of magnitude lower than the sampling frequency of the first sensing system. The sampling frequency of the second and third sensing systems may or may not be the same. In some cases, the sampling frequency of the second sensing system may be higher than the sampling frequency of the third sensing system. In other cases, the sampling frequency of the second sensing system may be lower than the sampling frequency of the third sensing system. The sampling frequencies of the first, second and/or third sensing systems may be fixed or variable. In some embodiments, the first sensing system may comprise an IMU, the second sensing system may comprise a GPS, and the third sensing system may comprise one or more vision sensors, as described elsewhere herein. In other embodiments, the first sensing system may comprise an IMU, the second sensing system may comprise one or more vision sensors, and the third sensing system may comprise a GPS sensor. Any configuration or order of the first, second, and third sensing systems may be contemplated.

The sensing system controller can be configured to obtain sensing data (e.g., IMU data) from the first sensing system (step 502). The sensing system controller can determine, using the sensing data of the first sensing system, an estimated physical state of the movable object during a time duration when the sensing data of the second and third sensing systems is unavailable or is not updated (step 504). The sensing system controller can obtain sensing data (e.g., GPS data) from the second sensing system (e.g., GPS sensor) when the data from the second sensing system becomes available or is updated (step 506). The sensing system controller can obtain, from the sensing data of the second sensing system, a first observed physical state of the movable object (step 508). The sensing system controller can also obtain sensing data (e.g., vision data) from the third sensing system (e.g., vision sensors) when the data from the third sensing system becomes available or is updated (step 510). The sensing system controller can obtain, from the sensing data of the third sensing system, a second observed physical state of the movable object (step 512).

Each time the data from the second sensing system (e.g., GPS data) becomes available or is updated, the sensing system controller is configured to perform a check on the new sensing data. The check comprises determining a deviation $D_{12}$ between the estimated physical state and the first observed physical state of the movable object (step 514). The deviation $D_{12}$ is a measure of dissimilarity between the first observed physical state and the estimated physical state. The deviation $D_{12}$ is indicative of a validity of the sensing data of the second sensing system relative to the first sensing system. The deviation $D_{12}$ can be determined using one or more statistical methods. In some embodiments, the deviation $D_{12}$ can be a Mahalanobis distance or a Euclidean distance calculated between the first observed physical state and the estimated physical state.

Similarly, each time the data from the third sensing system (e.g., vision data) becomes available or is updated, the sensing system controller is configured to perform a check on the new sensing data. The check comprises determining a deviation $D_{13}$ between the estimated physical state and the second observed physical state of the movable object (step 516). The deviation $D_{13}$ is a measure of dissimilarity between the second observed physical state and the estimated physical state. The deviation $D_{13}$ is indicative of a validity of the sensing data of the third sensing system relative to the first sensing system. The deviation $D_{13}$ can be determined using one or more statistical methods. In some embodiments, the deviation $D_{13}$ can be a Mahalanobis distance or a Euclidean distance calculated between the second observed physical state and the estimated physical state.

The sensing system controller is configured to compare the deviation $D_{12}$ to a predetermined threshold $T_{12}$ (step 518), and the deviation $D_{13}$ to a predetermined threshold $T_{13}$ (step 520). If (1) the deviation $D_{12}$ is greater than the predetermined threshold $T_{12}$ and (2) the deviation $D_{13}$ is greater than the predetermined threshold $T_{13}$, the sensing system controller is configured to determine the physical state of the movable object using only the estimated physical state from the first sensing system, without using the first and second observed physical states of the second and third sensing systems (step 522). For example, the sensing controller may use only the IMU data of the first sensing system to obtain the physical state of the movable object. In such instances, the estimated physical state from the IMU data may be selected to represent the physical state of the movable object. In some embodiments, the sensing system controller may be configured to discard the sensing data containing the first and second observed physical states, if (1) the deviation $D_{12}$ is greater than the predetermined threshold $T_{12}$ and (2) the deviation $D_{13}$ is greater than the predetermined threshold $T_{13}$.

In some embodiments, if (1) the deviation $D_{12}$ is equal to or less than the predetermined threshold $T_{12}$ and (2) the deviation $D_{13}$ is greater than the predetermined threshold $T_{13}$, the sensing system controller is configured to determine the physical state of the movable object, by updating the estimated physical state with the first observed physical state from the second sensing system, without using the second observed physical state from the third sensing system (step 524). For example, the sensing controller may update the IMU data of the first sensing system with only the GPS data of the second sensing system, to obtain the physical state of the movable object. In some embodiments, the sensing system controller may be configured to discard vision data of the third sensing system, if the deviation $D_{13}$ is greater than the predetermined threshold $T_{13}$.

Conversely, in other embodiments, if (1) the deviation $D_{12}$ is greater than the predetermined threshold $T_{12}$ and (2) the deviation $D_{13}$ is equal to or less than the predetermined threshold $T_{13}$, the sensing system controller is configured to determine the physical state of the movable object, by updating the estimated physical state with the second observed state from the third sensing system, without using the first observed physical state from the second sensing system (step 526). For example, the sensing controller may update the IMU data of the first sensing system with only the vision data of the third sensing system, to obtain the physical state of the movable object. In some embodiments, the sensing system controller may be configured to discard the GPS sensing data of the second sensing system, if the deviation $D_{12}$ is greater than the predetermined threshold $T_{12}$.

As noted above, the estimated physical state may be obtained from IMU data (e.g., from the first sensing system), the first observed physical state may be obtained from GPS data (e.g., from the second sensing system), and the second observed physical state may be obtained from vision data (e.g., from the third sensing system). The IMU data can be used to check the validity of the GPS data. For example, an IMU-calculated displacement (based on the estimated physical state) and a GPS-calculated displacement (based on the first observed physical state) between two different time points can be obtained. The deviation $D_{12}$ between the GPS-calculated displacement and the IMU-calculated displacement can be calculated. If the deviation $D_{12}$ is equal to or less than the predetermined threshold $T_{12}$, this may mean that the GPS data is reliable (or accurate). Conversely, if the deviation $D_{12}$ is greater than the predetermined threshold $T_{12}$, this may mean that the GPS data is unreliable (or inaccurate).

Likewise, the IMU data can be used to check the validity of the vision data. For example, an IMU-calculated displacement (based on the estimated physical state) and a vision-calculated displacement (based on the second observed physical state) from a current frame to the key frame can be obtained. The deviation $D_{13}$ between the vision-calculated displacement and the IMU-calculated displacement can be calculated. If the deviation $D_{13}$ is equal to or less than the predetermined threshold $T_{13}$, then the vision data is determined to be accurate (or valid). Conversely, if the deviation $D_{13}$ is greater than the predetermined threshold $T_{13}$, then the vision data is determined to be inaccurate (or invalid). Accordingly, the IMU data can be used to check the validity of different sets of sensing data using the above steps. In addition, the IMU data can be selectively updated (or fused) with different sets of sensing data, depending on their deviations relative to different predetermined thresholds.

In some embodiments, the sensing data (e.g., GPS data) from the second sensing system and the sensing data (e.g., vision data) from the third sensing system can be cross-checked against each other, after they have been checked against the sensing data (e.g., IMU data) from the first sensing system. Referring to FIG. 5, if (1) the deviation $D_{12}$ is equal to or less the predetermined threshold $T_{12}$ and (2) the deviation $D_{13}$ is equal to or less than the predetermined threshold $T_{13}$, the sensing system controller is configured to further determine a deviation $D_{23}$ between the first observed physical state and the second observed physical state of the movable object (step 528). The deviation $D_{23}$ is a measure of dissimilarity between the first observed physical state and the second observed physical state. The deviation $D_{23}$ is indicative of a validity of the sensing data of the third sensing system relative to the second sensing system (or a validity of the sensing data of the second sensing system relative to the third sensing system). The deviation $D_{23}$ can be determined using one or more statistical methods. In some embodiments, the deviation $D_{23}$ can be a Mahalanobis distance or a Euclidean distance calculated between the first observed physical state and the second observed physical state.

The sensing system controller is configured to compare the deviation $D_{23}$ to a predetermined threshold $T_{23}$ (step 530). If the deviation $D_{23}$ is equal to or less than the predetermined threshold $T_{23}$, the sensing system controller is configured to determine the physical state of the movable object, by updating the estimated physical state with (1) the first observed physical state from the second sensing system and/or (2) the second observed physical state from the third sensing system (step 532). For example, the sensing controller may update the IMU data of the first sensing system with the GPS data of the second sensing system and/or vision data of the third sensing system, to obtain the physical state of the movable object. Alternatively, the sensing controller may obtain the physical state of the movable object using only the first and second observed physical states from the second and third sensing systems, without using the estimated physical state from the first sensing system (step 534).

Conversely, if the deviation $D_{23}$ is greater than the predetermined threshold $T_{23}$, the sensing system controller is configured to determine the physical state of the movable object, based on the magnitude of the deviations $D_{12}$ and $D_{13}$ relative to each other. For example, if the deviation $D_{12}$ is less than the deviation $D_{13}$, the sensing controller is configured to update the estimated physical state with the first observed physical state from the second sensing system, without using the second observed physical state from the third sensing system (step 536). For example, the sensing controller may update the IMU data of the first sensing system with the GPS data of the second sensing system, without using the vision data of the third sensing system, to obtain the physical state of the movable object. In some embodiments, the sensing system controller may be configured to discard the vision data, if the deviation $D_{12}$ is less than the deviation $D_{13}$ and the deviation $D_{23}$ is greater than the predetermined threshold $T_{23}$.

In some cases, if the deviation $D_{13}$ is equal to the deviation $D_{12}$, the sensing controller is configured to update the estimated physical state with either the first observed physical state from the second sensing system, or the second observed physical state from the third sensing system (step 537).

Conversely, if the deviation $D_{13}$ is less than the deviation $D_{12}$, the sensing controller is configured to update the estimated physical state with the second observed physical state from the third sensing system, without using the first observed physical state from the second sensing system (step 538). For example, the sensing controller may update the IMU data of the first sensing system with the vision data of the third sensing system, without using the GPS data of the second sensing system, to obtain the physical state of the movable object. In some embodiments, the sensing system controller may be configured to discard the GPS sensing data, if the deviation $D_{13}$ is less than the deviation $D_{12}$ and the deviation $D_{23}$ is greater than the predetermined threshold $T_{23}$.

Accordingly, the GPS data can be used to cross-check the validity of the vision data (or the vision data can be used to cross-check the validity of the GPS data). For example, a GPS-calculated displacement (based on the first observed physical state) and a vision-calculated displacement (based on the second observed physical state) from a current frame to the key frame can be obtained. The deviation $D_{23}$ between the vision-calculated displacement and the GPS-calculated displacement can be calculated. If the deviation $D_{23}$ is equal to or less than the predetermined threshold $T_{23}$, then both the vision data and the GPS data may be determined to be accurate (or valid). Conversely, if the deviation $D_{23}$ is greater than the predetermined threshold $T_{23}$, one of the vision data and the GPS data may be selected to be updated (fused) with the IMU data, depending on their deviations relative to each other and with respect to the IMU data. Accordingly, the validity and usefulness of the GPS data and vision data can be cross-checked against each other using the above method.

In the example of FIG. 5, the physical state of the movable object can be determined by updating the estimated physical state to incorporate the first and/or second observed physical states. This can be achieved, for example, by fusing the estimated physical state with the first and/or second observed physical states using any appropriate sensor fusion techniques. In some embodiments, the first and second observed physical states can be fused together without including the estimated physical state. The sensor fusion techniques can include an algorithm based on a Kalman filter, an extended Kalman filter (EKF), an unscented Kalman filter (UKF), a particle filter (PF), or suitable combinations thereof. In some embodiments, the sensing system controller can also exclude sensing data from one or more of the second or third sensing systems from the sensor fusion analysis. For example, sensing data from one or more of the second or third sensing systems may be excluded if their deviations are greater than certain predetermined thresholds, as previously described.

Accordingly, the validity of the sensing data from different sensing systems can be checked by comparing their relative deviations to different predetermined thresholds. The predetermined thresholds can be obtained from experimental data. In some embodiments, the predetermined thresholds can comprise a range of values. In some embodiments, the predetermined thresholds are constants. Alternatively, the predetermined thresholds can be configured to vary depending on one or more of the following: (1) an environment in which the movable object operates; (2) one or more motion characteristics of the movable object; (3) a location of the movable object; or (4) an altitude of the movable object. For example, in some cases, at least one predetermined threshold can vary in real-time when (1) the movable object moves from one type of environment to another type of environment, (2) the one or more motion characteristics of the movable object changes, (3) the location of the movable object changes, and/or (4) the altitude of the movable object changes.

The first and second observed physical states of the movable object can depend on a plurality of different environment types in which the movable object operates. The plurality of different environment types can include distinct characteristics such as one or more of the following: (1) weather conditions, (2) object density and distribution, or (3) visual or physical properties of objects located within the different environment types. The first and second observed physical states of the movable object can also depend on one or more operating conditions of the second and third sensing systems. The operating conditions can include a signal strength, sensor type, malfunction, power level, sensing accuracy, and/or calibration level of the second and third sensing systems. The sensor signal strength can be dependent on one or more of sensor signal magnitude, number of sensing signals received by a sensing system. For example, a sensing system can comprise a GPS sensor, and the GPS signal strength can be dependent on one or more of the number of GPS sensing signals received (e.g., from different GPS satellites) or the magnitude of a GPS signal (e.g., as determined by the power of the signal). Examples of an environment where the GPS signal can be weak can include an indoor environment, obstructions by structures or naturally occurring features, inclement weather conditions, lack of satellites overhead, or malfunction with a GPS receiver. Examples of environments where the GPS signal can be strong can include an outdoor environment, high altitude, lack of obstructions, or clear weather conditions. In one scenario, a movable object may be flying at low altitude surrounded by a number of tall buildings. This may result in blocking or weakening satellite signals, which may correspondingly result in a weak GPS signal or loss of GPS signal.

Embodiments of the disclosure can be used to determine suitability of a sensing system for different environment types, and/or whether a sensing system is operating as desired or whether it is malfunctioning. A suitability or an operating condition of the second sensing system in an environment can be determined based on a deviation $D_{12}$ relative to a predetermined threshold $T_{12}$, while the movable object is operating within the environment. As an example, the second sensing system is determined to be suitable for a first environment type and/or operating in a desired manner, when the deviation $D_{12}$ is equal to or less than the predetermined threshold $T_{12}$ while the movable object is operated within the first environment type. Conversely, the second sensing system may be determined to be unsuitable or less suitable for a second environment type or is malfunctioning, when the deviation $D_{12}$ is greater than the predetermined threshold $T_{12}$ while the movable object is operating within the first environment type.

Multi-Thread Decision-Based Control of Multiple Vision Sensors

In some embodiments, a sensing system controller can include a multi-thread decision-based algorithm for controlling multiple vision sensors on a movable object. The algorithm can be implemented using a combination of hardware and/or software. The sensing system controller can detect an operational status of each vision sensor of a plurality of vision sensors. For example, the sensing system controller can detect whether a first vision sensor is malfunctioning or generating inaccurate vision sensing data, and switch from the first vision sensor to one or more other vision sensors to ensure smooth operation and data acquisition. The multi-thread decision-based algorithm can provide an operational safety factor/redundancy margin. For example, the multi-thread decision-based algorithm can be used to improve the safety of the movable object, by reducing accidents caused by individual vision sensor failure or inaccurate sensing data.

The multiple vision sensors may be provided as a plurality of imaging devices that are mounted to different parts of a movable object. A plurality of imaging devices may comprise binocular cameras and/or monocular cameras. At least one imaging device may be a camera that is capable of operating in a multi-ocular mode. Additionally, at least one imaging device may be a camera that is capable of operating in a monocular mode. In some embodiments, at least one imaging device can be a camera that is capable of operating in either a monocular mode or a multi-ocular mode. The multi-ocular mode may include a binocular mode (or stereoscopic mode).

In some embodiments, the plurality of imaging devices are coupled to the movable object, and may comprise (1) at least one first imaging device configured to operate in a multi-ocular mode and (2) at least one second imaging device configured to operate in a monocular mode. For example, the plurality of imaging devices may comprise a plurality of first imaging devices operably coupled to different sides of the movable object (e.g., front, rear, left, right, top, and bottom). The first imaging devices may include binocular cameras. In some cases, a first binocular camera may be mounted in a forward-facing direction of the movable object, a second binocular camera may be mounted in a rear-facing direction of the movable object, a third binocular camera may be mounted in a left-facing direction of the movable object, a fourth binocular camera may be mounted in a right-facing direction of the movable object, a fifth binocular camera may be mounted in a top-facing direction of the movable object, and a sixth binocular camera may be mounted in a bottom-facing direction of the movable object. In some embodiments, more than one camera can be mounted on one side of the movable object.

The second imaging device may be operably coupled to the movable object via a carrier. The second imaging device may be capable of rotating about at least one axis relative to the movable object via the carrier. In some embodiments, the carrier may be a multi-axis gimbal.

The sensing system controller can be configured to obtain a spatial configuration of the plurality of imaging devices relative to one another and to the movable object. When the movable object comprises multiple imaging devices having optical axes extending in various directions (e.g., forward-facing, rear-facing, left-facing, right-facing, top-facing, or bottom-facing), a positional relation between each imaging device and the IMU on the movable object can be determined. Since the IMU onboard the movable object is typically not sensitive to translational movement, the translational relation between the IMU and each imaging device can be directly obtained if the sizes and positions of the imaging devices on the movable object are known. The rotational relation between each imaging device and the IMU can be calculated using a hand-eye calibration method.

Calibration of Imaging Device with IMU

Figure 6:
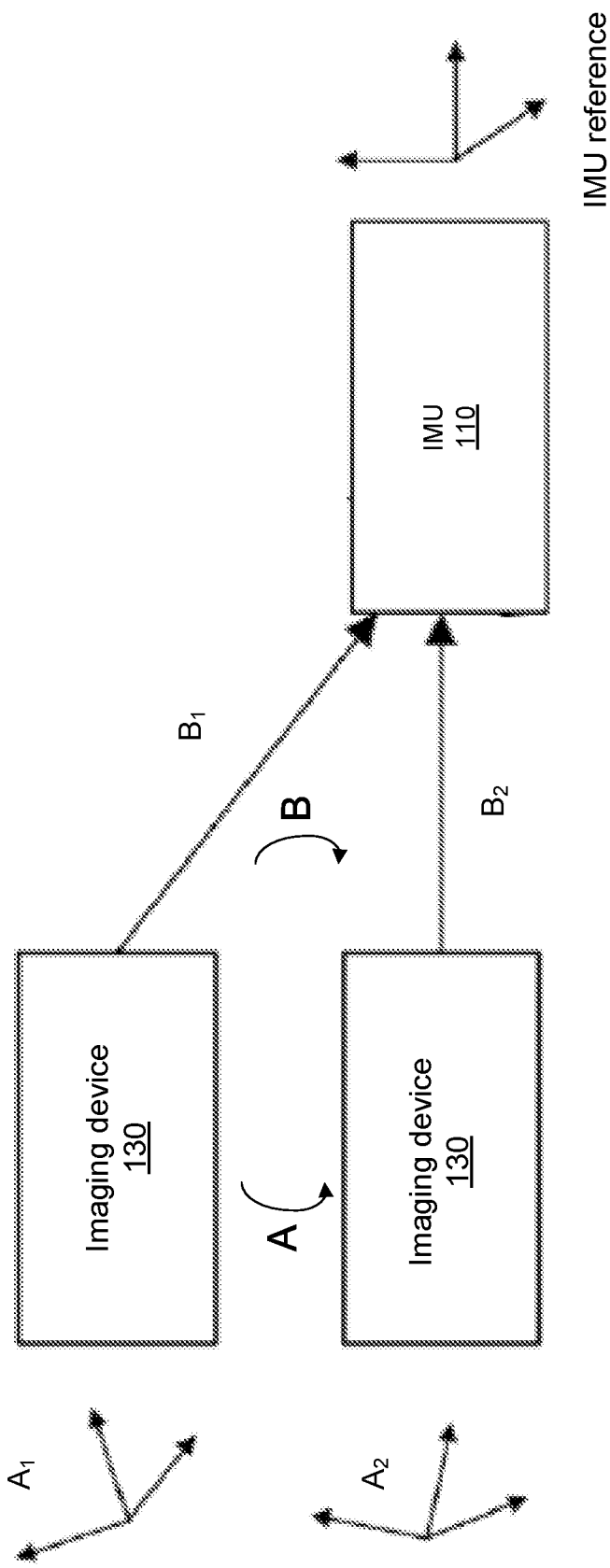
FIG. 6 illustrates calibration of an imaging device with an IMU, in accordance with some embodiments.

Next, the calibration of an imaging device with an IMU is described with reference to FIG. 6. The fusion of IMU data from an IMU 110 and vision data from the imaging device 130 (e.g., a camera) may require the determination of a positional and/or angular relation between the imaging device 130 and the IMU 110. A rotation A of the camera between two positions can be calculated based on image data (successively captured images). The IMU and the camera may be located on a movable object. A rotation B of the movable object can be obtained from the IMU data. A rotation R from the IMU to the camera can be subsequently calculated. In some embodiments, the positional and angular relation between the camera and the IMU can be calculated by the sensing system controller.

$$AXB^TX^T=I \rightarrow AX=XB \rightarrow AX-XB=0$$

An appropriate X (i.e., a rotation of the camera to IMU) can be found by minimizing $\min\|AX-XB\|$.

The camera can be calibrated with respect to the IMU, by acquiring multiple images over time by the camera and estimating the self-position changes by the camera. In some instances, the method of self-calibration is similar to calibrating two independent cameras by considering two images of the camera taken at different times i and i' as taken by two cameras $\alpha$ and $\beta$. Similarly, the self-calibration scheme can be applied to IMU. Let A and B denote self-coordinate changes of the camera and IMU, respectively. Place subscripts i to denote the coordinate system mappings $A_i$ and $B_i$ at time i=1, 2, ..., n. It follows that the mappings at time 2 relevant to time 1 are: $A=A_2A_1^{-1}$ and $B=B_2B_1^{-1}$. Let X denote the mapping between the camera and IMU, the hand-eye calibration formula leads to AX=XB, wherein the A, B, X are normalized mapping with following form:

$$A = \begin{pmatrix} R_A & t_A \\ 0 & 1 \end{pmatrix}, B = \begin{pmatrix} R_B & t_B \\ 0 & 1 \end{pmatrix}, X = \begin{pmatrix} R_X & t_X \\ 0 & 1 \end{pmatrix}.$$

Furthermore, $R_A R_X = R_X R_B$ and $(R_A-I)t_X=R_X t_B - t_A$. Following these equations and taking into account the properties of rotation matrices, there are multiple ways to solve Rx and $t_X$. To guarantee a unique solution, a requirement on n≥3 needs to be enforced.

Selection of Vision Sensing Mode

The sensing system controller is capable of selecting a vision sensing mode for each of the plurality of imaging devices. The sensing system controller can be configured to determine one or more of the following: (a) a distance of the movable object to an object or surface lying within the field-of-view of at least one imaging device, (b) a disparity between matched points in one or more stereoscopic images acquired by the first imaging device, or (c) an environment in which the plurality of imaging devices are operated. The sensing system controller is further configured to select, based on the determination of one or more of (a), (b) and (c) above, at least one of the first and second imaging devices for acquiring image data in a multi-ocular mode (e.g., binocular mode) or the monocular mode. In some embodiments, a single imaging device may be configured to operate and switch between two or more imaging modes, which may include a monocular mode and a multi-ocular mode. As an example, an imaging device may be configured to operate in the monocular mode in one instance, and operate in the multi-ocular mode in another instance. A multi-ocular mode may include a binocular mode (or stereo mode).

The imaging devices can be operated in various types of environments, such as outdoor, indoor, high altitude, low altitude, urban, rural, and others. Different types of environments may be differentiated from each other based on various environmental characteristics and/or conditions. For example, outdoor and indoor environments can be differentiated based on the degree to which the environment is enclosed (e.g., by walls, ceilings, roofs, and other structures). As another example, high and low altitude environments can be differentiated based on a predetermined distance threshold, such as the distance from the ground. In some embodiments, an environment less than or equal to approximately 10 m or 50 m from the ground may be considered to be a low altitude environment, whereas an environment greater than or equal to approximately 10 m or 50 m from the ground may be considered to be a high altitude environment. In some embodiments, environment types can be differentiated based on the amount, type, density, etc. of objects (e.g., natural or manmade structures, obstacles, or other entities) within the environment. For instance, an urban or suburban environment may be characterized by having a high density of manmade structures and human beings, whereas a rural environment may be characterized by having a high density of natural structures and few human beings. Other characteristics that may be used to distinguish between different environment types include weather conditions (e.g., wind speed, visibility, precipitation), terrain (e.g., mountainous, forested, over water), amount of human activity (e.g., high populated, less populated, unpopulated), amount of aerial activity (e.g., due to birds, aircraft, other aerial vehicles), proximity to safety hazards (e.g., power lines, buildings, restricted air spaces such as airports), and so on. The vision sensing mode for each of the plurality of imaging devices can be selected based on the environment type, as described elsewhere herein.

The distance of the movable object to an object or surface lying within the field-of-view of at least one imaging device can be determined using one or more proximity sensors, the first imaging device, the second imaging device, and/or a barometer. The object may be a target in the environment, and the movable object can be configured to capture images of the target or track the target. A surface may be a ground level, or any type of reference surface or terrain. In some cases, a surface may be the surface of an object (e.g., a building). Examples of proximity sensors may include ultrasonic sensors, time-of-flight cameras, and/or LIDAR. A barometer can be used to measure an altitude of the movable object. The distance of the movable object to an object or surface lying within the field-of-view of at least one imaging device can also be determined using 3-D depth, positional, and/or motion information obtained from one or more stereoscopic images captured by the first imaging device. Alternatively, the distance can be determined using positional and/or motion information obtained from the IMU data, one or more images captured by the second imaging device, and the spatial configuration of the second imaging device relative to the movable object.

Vision Sensor Selection Based on Predefined Threshold Distance

Figure 7:
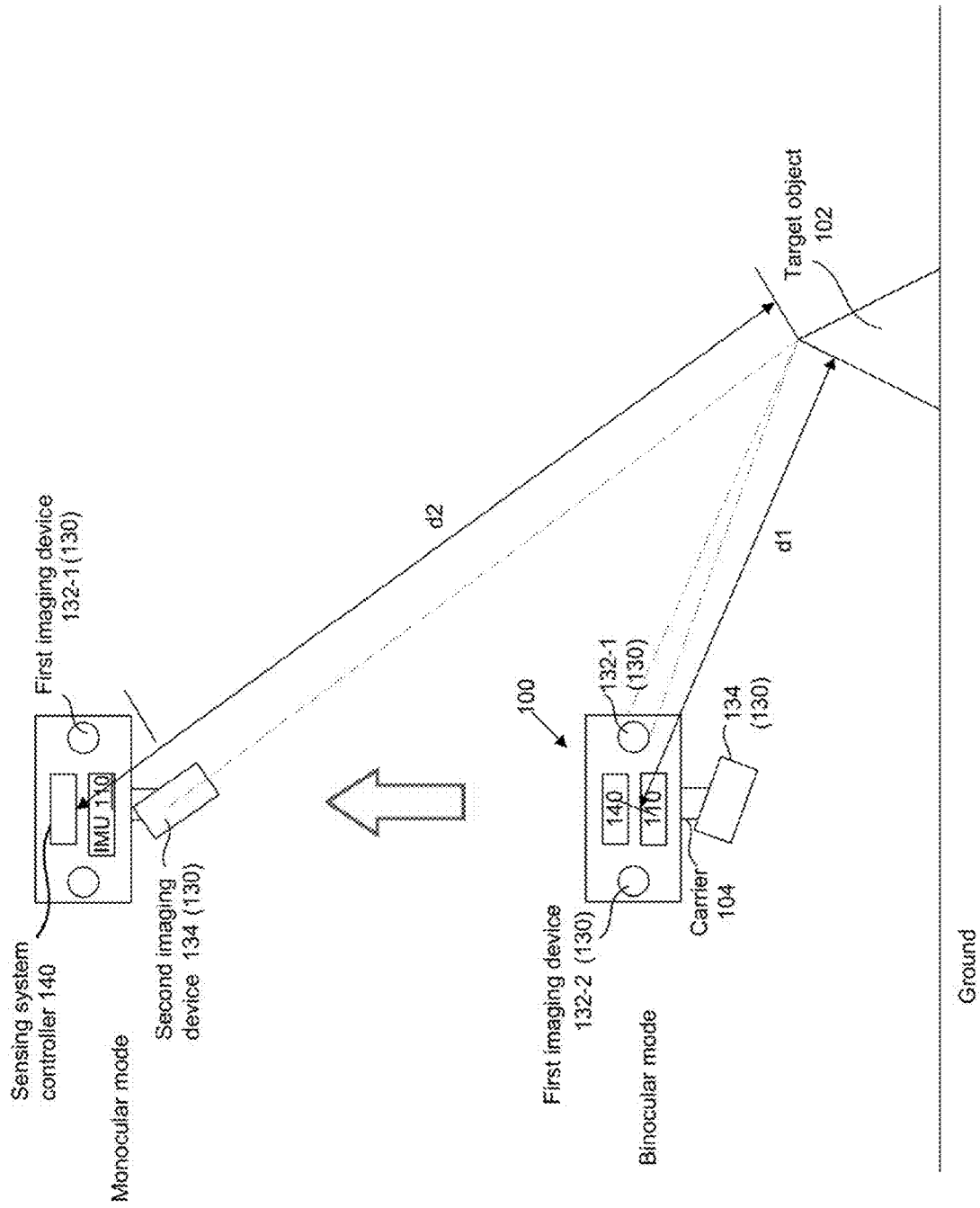
FIG. 7 illustrates vision sensor selection based on a predefined threshold distance, in accordance with some embodiments.

FIG. 7 illustrates an example of vision sensor selection based on a predefined threshold distance, in accordance with some embodiments. Referring to FIG. 7, a plurality of imaging devices 130 may be coupled to a movable object 100. The imaging devices may comprise (1) at least one first imaging device 132 configured to operate in a multi-ocular mode and (2) at least one second imaging device 134 configured to operate in a monocular mode. In some embodiments, a plurality of first imaging devices 132-1, 132-2 may be provided. For example, the first imaging device 132-1 may be mounted on a front side of the movable object, and the first imaging device 132-2 may be mounted on a rear side of the movable object. The first imaging devices 132-1 and 132-2 may operate independently of each other. For example, the imaging device 132-1 may be a first binocular camera configured to capture image data from the front side of the movable object, and the imaging device 132-2 may be a second binocular camera configured to capture image data from the rear side of the movable object. In some alternative embodiments, the first imaging devices 132-1 and 132-2 may operate in conjunction with each other and/or with other imaging devices, so as to form a multi-ocular imaging system that is capable of capturing images from multiple viewpoints. The second imaging device 134 may be operably coupled to the movable object via a carrier 104. The carrier can permit the second imaging device to rotate about at least one axis relative to the movable object.

The movable object may include a sensing system controller 140 onboard the movable object. Alternatively, the sensing system controller may be remote from the movable object. The sensing system controller can be configured to obtain a spatial configuration of the plurality of imaging devices relative to one another and to an IMU 110 onboard the movable object. The spatial configuration can be obtained using hand-eye calibration as described elsewhere herein.

The movable object 100 may be located within an environment. A target 102 may be located within the environment. The target may be a stationary object, a moving object, or an object that is capable of motion. A distance d of the movable object to the target can be determined using one or more proximity sensors, stereoscopic images captured by the first imaging device, etc. as described elsewhere herein. For example, the sensing system controller can determine that the movable object is initially located at a distance d1 to the target.

The sensing system controller can compare the distance d of the movable object to a predefined threshold distance D, in order to select an appropriate vision sensing mode (and set of vision sensors). The comparison may be performed substantially in real-time as the movable object is moving. When the distance d is equal to or less than the predefined threshold distance (e.g., when $d1 \leq D$), the sensing system controller may select the first imaging device 132-1 for acquiring image data in the multi-ocular mode (e.g., binocular mode). Conversely, when the distance d is greater than the predefined threshold distance, the sensing system controller may select the second imaging device 134 for acquiring image data in the monocular mode (e.g., when $d2 > D$). In some embodiments, the predefined threshold distance may be obtained from experimental data. The predefined threshold distance can comprise a range of values. In some embodiments, the predefined threshold distance can be a constant. Alternatively, the predefined threshold distance can be configured to vary or be adjusted depending on one or more of the following: (1) the environment in which the movable object is operated, (2) a location of the movable object, or (3) an altitude of the movable object. In some embodiments, the first and second imaging devices may be replaced by a single imaging device that is capable of switching between the multi-ocular mode and the monocular mode, depending one or more of the above factors associated with the predefined threshold distance.

Vision Sensor Selection Based on Predefined Threshold Disparity

In some embodiments, the sensing system controller can be configured to determine a disparity between matched points in one or more stereoscopic images. The stereoscopic images can be captured, for example by the first imaging device 132-1. The sensing system controller can compare the disparity between the matched points to a predefined threshold disparity, in order to select an appropriate vision sensing mode (and corresponding set of vision sensors). The predefined threshold disparity dp can be calculated as follows: dp=c*f/H wherein c is a baseline constant, f is a focal length of the first imaging device, and H is a predefined threshold height. The predefined threshold height H may be used as a reference, to switch between the first imaging device (binocular mode) and second imaging device (monocular mode).

When the disparity is greater than the predefined threshold disparity, the sensing system controller may select the first imaging device 132-1 for acquiring image data in the multi-ocular mode. Conversely, when the disparity is equal to or less than the predefined threshold disparity, the sensing system controller may select the second imaging device 134 for acquiring image data in the monocular mode. The predefined threshold disparity can be obtained from experimental data. The predefined threshold disparity can comprise a range of values. In some embodiments, the predefined threshold distance can be a disparity. Alternatively, the predefined threshold disparity can be configured to vary or be adjusted depending on one or more of the following: (1) the environment in which the movable object is operated, (2) weather conditions within the environment, (3) an altitude of the movable object, (4) object density and distribution within the environment, or (5) visual or physical properties of objects located within the environment. In some embodiments, the first and second imaging devices may be replaced by a single imaging device that is capable of switching between the multi-ocular mode and the monocular mode, depending one or more of the above factors associated with the predefined threshold disparity.

Vision Sensor Selection Based on Predefined Threshold Height

Figure 8:
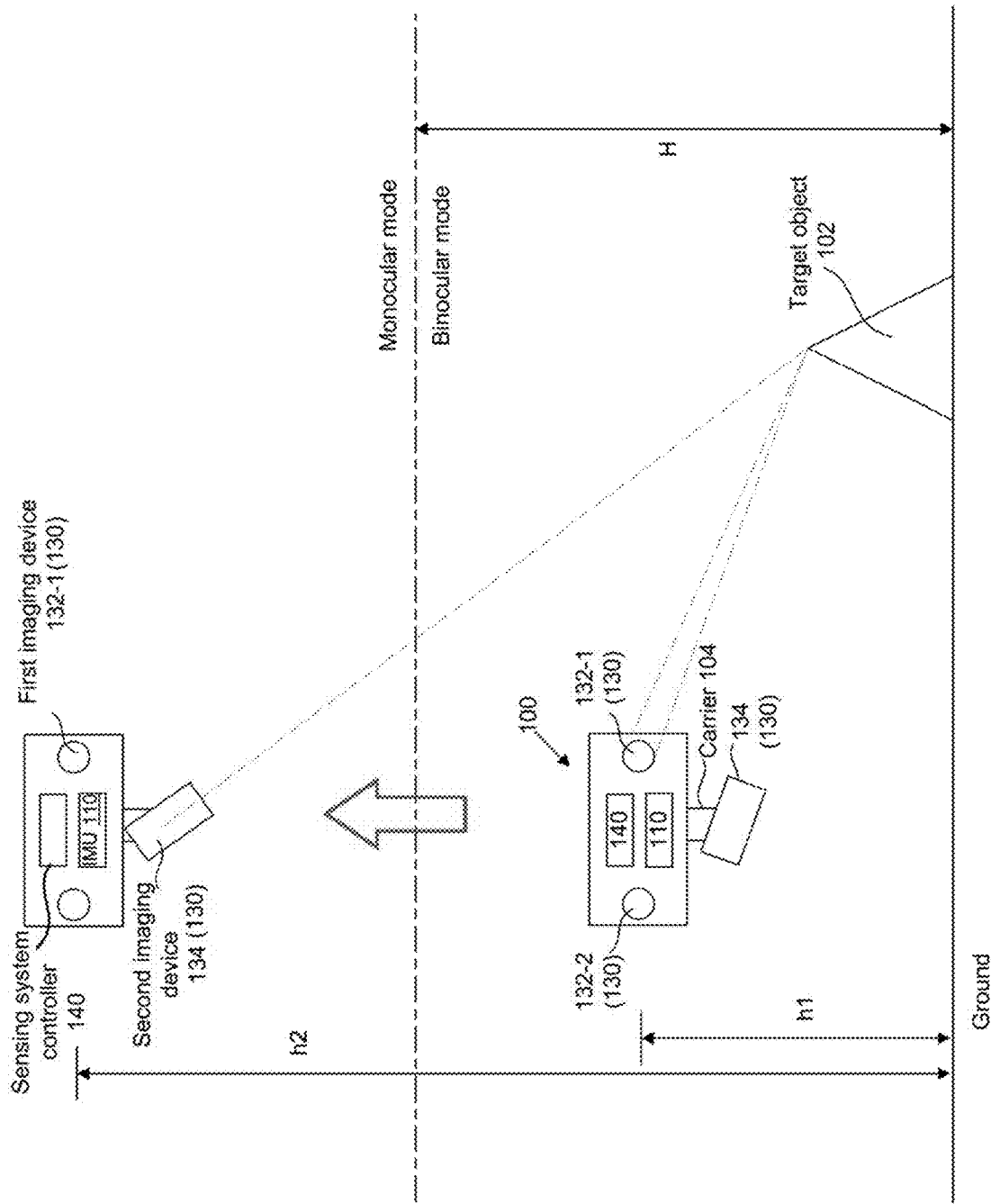
FIG. 8 illustrates vision sensor selection based on a predefined threshold height, in accordance with some embodiments.

In some embodiments, the sensing system controller can be configured to compare a height h of the movable object (as measured from a surface) to the predefined threshold height H, in order to select an appropriate vision sensing mode (and corresponding set of vision sensors). Referring to FIG. 8, when the height h is equal to or less than the predefined threshold height (e.g., when h1≤H), the sensing system controller may select the first imaging device 132-1 for acquiring image data in the multi-ocular mode (e.g., binocular mode). Conversely, when the height h is greater than the predefined threshold height, the sensing system controller may select the second imaging device 134 for acquiring image data in the monocular mode (e.g., when h2>H). In some embodiments, the predefined threshold height H can be a manually set value, and may be obtained from experimental data collected for the movable object. For example, experimental data may indicate that the binocular image data is below an acceptable quality when the movable object is higher than 8 m above ground level. The experimental data may further indicate that the binocular image data is of acceptable quality when the movable object is less than 8 m above ground level. In such instances, the predefined threshold height H can be set to 8 m.

In some embodiments, the predefined threshold height can comprise a range of values. In some embodiments, the predefined threshold height can be a constant. Alternatively, the predefined threshold height can be configured to vary or be adjusted depending on one or more of the following: (1) the environment in which the movable object is operated, (2) a location of the movable object, or (3) an altitude of the movable object. In some embodiments, the predefined threshold height may be based on intrinsic parameters of the vision sensing system, such as focal length, type of lenses (normal or wide-angle), field of view, imaging resolution, etc. In some embodiments, the first and second imaging devices may be replaced by a single imaging device that is capable of switching between the multi-ocular mode and the monocular mode, depending one or more of the above factors associated with the predefined threshold height.

In some embodiments, the sensing system controller may select the second imaging device for acquiring image data in the monocular mode when the sensing system controller determines (1) a low level of binocular matching, (2) an average disparity is low (e.g., when the disparity equal to or less than the predefined threshold disparity), (3) the height of the movable object is greater than the predefined threshold height, and/or (4) if a relative distance from the movable object to a target is greater than a predetermined threshold distance. Low binocular matching can occur if a scene lacks texture, such as a body of water or a flat plain field with few distinguishing visual features. The level of binocular matching can be determined using optical flow matching techniques and ZNCC detection. As previously described, proximity sensors such as TOF cameras, sonar, laser, LIDAR, etc. can detect a height of the movable object from the ground, or the relative distance of the movable object to a target.

In some embodiments, the proximity sensors can also include at least one ultrasonic sensor (e.g., a wide angle sensor, an array sensor) and/or at least one lidar sensor. An ultrasonic array sensor may provide improved detection accuracy compared to other types of ultrasonic sensors. The proximity sensors can also be carried by the movable object. The proximity sensors can be located near the vision sensors. Alternatively, the proximity sensors can be situated on a portion of the movable object different from the portions used to carry the imaging devices.

In some embodiments, one or more motion characteristics of the movable object can be calculated based on the image data obtained by the first imaging device and/or the second imaging device. The one or more motion characteristics of the movable object can be calculated using depth information in the stereoscopic images obtained by the first imaging device. Alternatively and/or additionally, the one or more motion characteristics of the movable object can be calculated by applying a transformation between two or more successive images captured by the second imaging device.

The selection between monocular mode (or monocular camera) and binocular mode (or binocular camera) can be used to compensate for the limitations of the individual modes and cameras, thereby improving the accuracy of the vision sensing. In some embodiments, different cameras can be used to collect image data of different portions of an environment. The selection of which camera to use can be based on any suitable criteria, such as the relative signal quality and/or accuracy of the sensing signals for that particular portion of the environment. The quality and accuracy of sensing data may depend on the specific characteristics of each vision sensor, and may vary based on environment type (e.g., indoor, outdoor, low altitude, high altitude), weather conditions (e.g., clear, rainy, foggy), relative location of the sensed environmental objects (e.g., short range, long range), as well as the properties of the sensed environmental objects (e.g., transparency, reflectivity, absorbance, shape, size, material, mobility, etc.). For example, the binocular camera (or binocular mode) may be more accurate than the monocular camera (or monocular mode) at short ranges. Conversely, the monocular camera (or monocular mode) may be more accurate than the binocular camera (or binocular mode) at long ranges. The above scenarios are depicted in FIGS. 7 and 8, and previously described. Accordingly, the binocular mode (or binocular camera) can be used for vision sensing of environment portions relatively close to the movable object, while the monocular mode (or monocular camera) can be used for vision sensing of environment portions relatively far from the UAV. Alternatively or in combination, the selection of which camera to use can be based on whether an environmental portion lies within a suitable sensing range of the corresponding camera. This approach may be advantageous in embodiments where the monocular and binocular cameras are configured for different sensing ranges.

In some embodiments, vision sensing in combination with proximity sensing can be used to compensate for the limitations of the individual sensor types, thereby improving the accuracy of the vision sensing. For instance, cameras can produce relatively high resolution color images. However, it may be relatively difficult to obtain accurate depth data from image data when a monocular camera is used, or when the individual sensors in a binocular camera is relatively small (as may occur when the binocular camera is fitted to a small-scale movable object). Additionally, vision sensors may not be able to provide satisfactory image data when the lighting is bright or has high contrast, or in adverse environmental conditions such as rain, fog, or smog. Conversely, proximity sensors such as ultrasonic sensors may provide accurate depth data, but may have a lower resolution compared to vision sensors. Also, in some instances, ultrasonic sensors and other proximity sensor types may not be able to detect objects with small reflective surfaces (e.g., twigs, corners, railings) or absorbent objects (e.g., carpeting), or may not be able to resolve distances in complex environments having many objects (e.g., indoor environments). However, vision sensing data may generally be complementary to proximity sensing data, in that the vision sensor is able to produce reliable data in conditions where the proximity sensor is generating less than optimal data, and vice-versa. Accordingly, the combined use of vision and proximity sensors can be used for sensing under a wide variety of operating conditions and for diverse types of environments.

Figure 9:
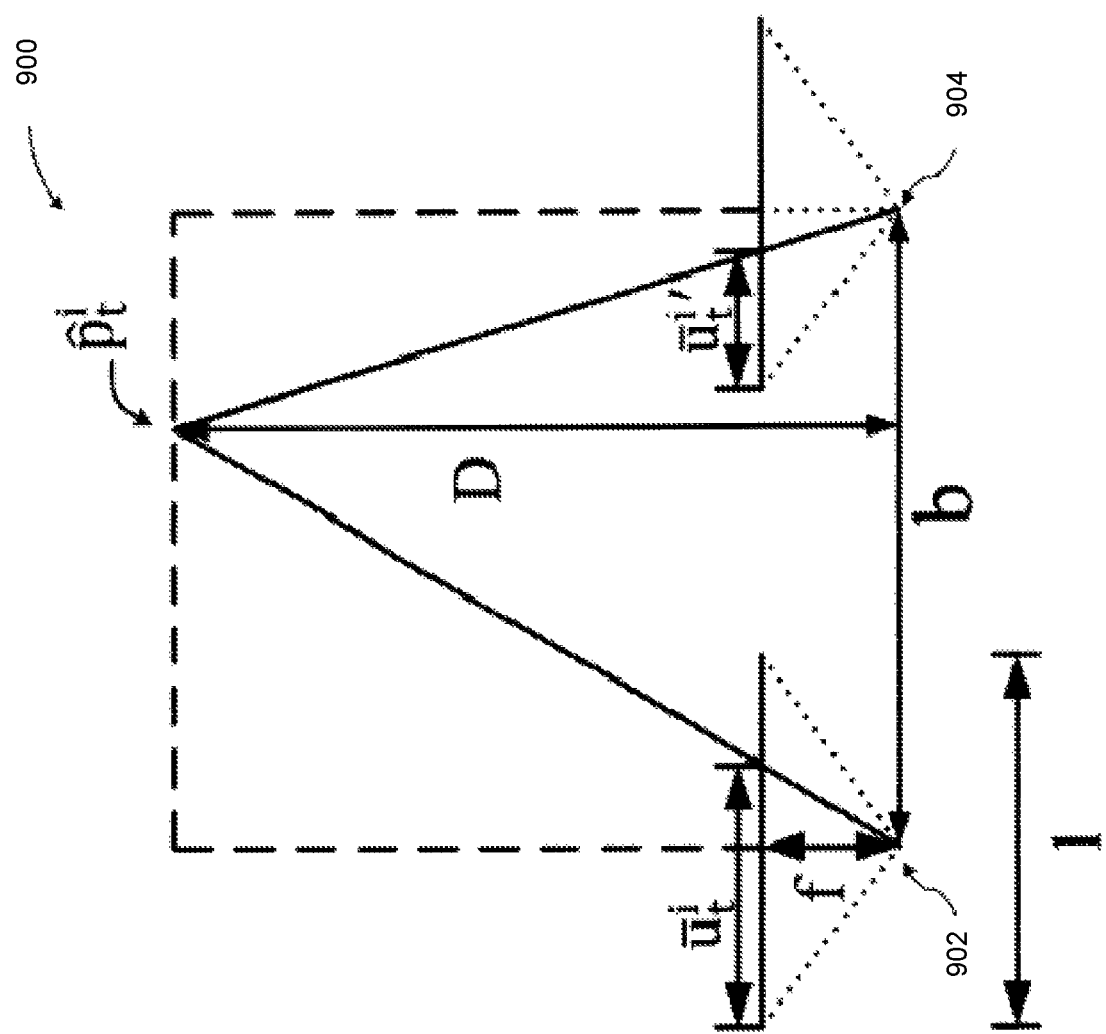
FIG. 9 illustrates a binocular camera for stereo vision, in accordance with some embodiments.

FIG. 9 illustrates a binocular camera 900 for stereo vision, in accordance with some embodiments. The camera 900 can include a left vision sensor and a right vision sensor (not shown) centered at positions 902 and 904, respectively. The parameters focal length f, photosensor size l, and the distance between the cameras b are known for each vision sensor. In some embodiments, the aforementioned parameters are the same for each vision sensor. The 3D coordinate $\hat{p}_t^i$ corresponds to a pair of matched feature points $m_t^j=(u_t^j, v_t^j)$ and $m_t^h=(u_t^h, v_t^h)$ in the images captured by the left and right vision sensors, respectively. The pixel distances $u_t^j$ and $u_t^h$ can be multiplied by the size of a single pixel to become spatial distances $\bar{u}_t^j$ and $\bar{u}_t^h$. Thus, using the formula $$\frac{D}{f}|\bar{u}_t^i - l/2| + \frac{D}{f}|\bar{u}_t^{i'} - l/2| = b$$

the distance between the 3D coordinate $\hat{p}_t^i$ and the vision sensors, denoted D, can be determined. Based on the internal parameter matrix of the camera K and calculated value of D, the estimated 3D coordinate $\hat{p}_t^i$ can thus be derived for the point $(u_t^i, v_t^i)$.

Following frame-to-frame matching and stereo matching of feature points, a feature point-3D coordinate pair $c_i=\{m_t^i, \hat{p}_t^i\}$ can be obtained for each feature point. The velocity of the camera can thus be determined by analyzing the motion of the feature points within the images using any suitable algorithm. For example, given a set of n coordinate pairs $c_1, c_2, \ldots, c_n$ obtained at a time t, the matrix $\tilde{R}$ can be expressed as three row vectors $\tilde{R}=[\tilde{r}_1\ \tilde{r}_2\ \tilde{r}_3]^T$, and the internal parameter matrix of the camera can be expressed as $$K = \begin{bmatrix} f_u & 0 & u_c \\ 0 & f_v & v_c \\ 0 & 0 & 1 \end{bmatrix}$$

Consequently, an estimated positional movement or change between each feature point in time, $\hat{T}_v$, can be obtained by solving $$\begin{bmatrix} (u_t^1 - u_c)\tilde{r}_3^T \hat{p}_t^1 - f_u \tilde{r}_1^T \hat{p}_t^1 \\ (u_t^1 - u_c)\tilde{r}_3^T \hat{p}_t^1 - f_v \tilde{r}_1^T \hat{p}_t^1 \\ (u_t^2 - u_c)\tilde{r}_3^T \hat{p}_t^2 - f_u \tilde{r}_1^T \hat{p}_t^2 \\ (v_t^2 - v_c)\tilde{r}_3^T \hat{p}_t^2 - f_v \tilde{r}_1^T \hat{p}_t^2 \\ \cdots \\ (u_t^n - u_c)\tilde{r}_3^T \hat{p}_t^n - f_u \tilde{r}_1^T \hat{p}_t^n \\ (v_t^n - v_c)\tilde{r}_3^T \hat{p}_t^n - f_v \tilde{r}_1^T \hat{p}_t^n \end{bmatrix} = \begin{bmatrix} f_u & 0 & u_c - u_t^1 \\ 0 & f_v & v_c - v_t^1 \\ f_u & 0 & u_c - u_t^2 \\ 0 & f_v & v_c - v_t^2 \\ \cdots & \cdots & \cdots \\ f_u & 0 & u_c - u_t^n \\ 0 & f_v & v_c - v_t^n \end{bmatrix} \cdot \hat{T}_v$$

As the estimated positional movement is primarily obtained based on frame matching of image data from the vision sensors 902, 904, the accuracy and precision of this estimate can be influenced by the size of n. For example, the accuracy and precision of the estimate may increase as n increases.

Figure 10:
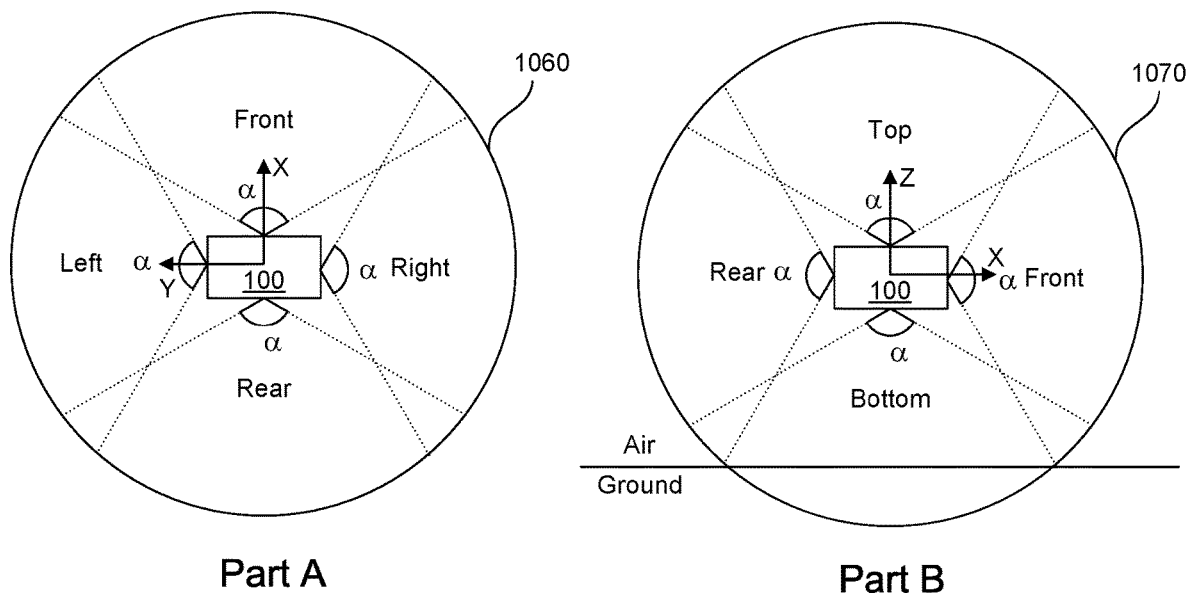
FIG. 10 illustrates a visual sensing range of a movable object, in accordance with some embodiments.
Figure 10:
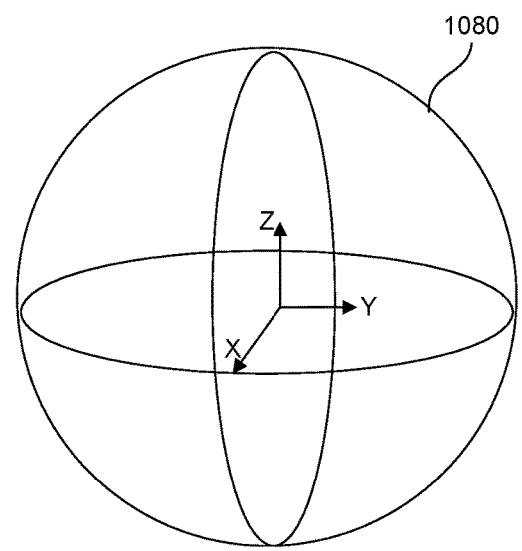

FIG. 10 illustrates a visual sensing range of a movable object, in accordance with some embodiments. Part A of FIG. 10 shows the visual sensing range of a movable object 100 from an aerial view as viewed from above the movable object. Part B of FIG. 10 shows the visual sensing range of the movable object from a lateral view as viewed from the right side of the movable object.

Part C of FIG. 10 shows the visual sensing range of the movable object in 3-dimensional space. The movable object in FIG. 10 may be, for example a UAV that is configured to operate in an environment. The visual sensing range may correspond to an environmental sensing range.

A plurality of imaging devices can be coupled to different sides of the movable object. For example, the plurality of imaging devices can be coupled to at least a front side, rear side, left side, right side, top side, or a bottom side of the movable object. Each imaging device may have an angle of view α. The maximum visual sensing range may be determined based on the angle of view α (horizontally, vertically, and diagonally) and image sensor size within each imaging device. A shape of the visual sensing range may be schematically depicted as circles 1060 and 1070 (2-D view in parts A and B), or a sphere 1080 (3-D view in part C). It should be noted that the visual sensing range can be defined by any shape and/or size, and that the sensitivity/accuracy of the visual sensing may decrease with increasing distance away from the movable object. In some embodiments, the visual sensing range can have defined by a regular shape (e.g., cube, cylinder, cone, etc.) or an irregular shape surrounding the movable object.

In some cases, the fields of view of adjacent imaging devices may overlap with one another, for example as shown in part A of FIG. 9. The overlap in the fields of view ensures that sufficient image data points of the environment can be collected. In some alternative cases, the fields of view of adjacent imaging devices need not overlap with one another. In some cases, an environmental map can be constructed with a certain level of accuracy based on the collected image data points.

The plurality of imaging devices may be configured to capture monocular, binocular or multi-ocular images of the environment surrounding the movable object. One or more of the imaging devices may capture images at a same time instance or at different time instances. A 3-D depth map of the environment can be obtained from the binocular or multi-ocular images. The plurality of imaging devices may provide fields of view of n degrees. In some embodiments, n may be about 90°, 100°, 110°, 120°, 130°, 140°, 150°, 160°, 170°, 180°, 190°, 200°, 210°, 220°, 230°, 240°, 250°, 260°, 270°, 280°, 290°, 300°, 310°, 320°, 330°, 340°, 350°, or 360°. Any value for n may be contemplated. For example, n may be greater than 0°, or less than or equal to 360°. When n is 360°, complete-surround visual sensing can be obtained. In some cases, the visual sensing range may be defined by a sphere having a predetermined radius from the center of the movable object. The predetermined radius may range from several meters to hundreds of meters.

For example, the predetermined radius may be about 1 m, 5 m, 10 m, 20 m, 30 m, 40 m, 50 m, 60 m, 70 m, 80 m, 90 m, 100 m, 200 m, 300 m, 400 m, 500 m, or any values therebetween. In some cases, the predetermined radius may be less than 1 m or greater than 500 m. Any value for the predetermined radius may be contemplated. In some embodiments, the visual sensing range may depend on an environmental complexity of the environment in which the movable object operates. The visual sensing range can dynamically adjust as the movable object moves through different environments. For example, when the movable object is moving in an environment comprising a large number of objects or obstacles, the visual sensing range can be extended, and/or a sensitivity level (e.g., resolution) of the visual sensing may be increased. Conversely, when the movable object is moving in an environment comprising a low number of objects or obstacles, the visual sensing range may be reduced, and/or a sensitivity level (e.g., resolution) of the visual sensing may be decreased.

The imaging devices may be capable of taking multiple images substantially simultaneously, sequentially, or at different points in time. The multiple images may aid in the creation of a 3D scene, a 3D virtual environment, a 3D map, or a 3D model. For instance, a right-eye image and a left-eye image may be taken and used for stereo-mapping. A depth map may be calculated from a calibrated binocular image, as described in detail below. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

In some embodiments, stereoscopic image data obtained from one or more imaging devices can be analyzed to determine the environmental information. The stereoscopic image data can include binocular images or video. The environmental information may comprise an environmental map. The environmental map may comprise a topological map or a metric map. The metric map may comprise at least one of the following: a point cloud, a 3D grid map, a 2D grid map, a 2.5D grid map, or an occupancy grid map. The occupancy grid may be used to define a 3D map of the spatial environment surrounding the movable object.

In some embodiments, analysis of stereoscopic video data may comprise at least one of the following: (1) imaging device calibration, (2) stereo matching of image frames, and (3) depth map calculation. The imaging device calibration may comprise calibrating intrinsic parameters and extrinsic parameters of an imaging device such as a binocular camera. The binocular camera may be configured to capture one or more binocular images. The stereoscopic video data may be obtained from a plurality of binocular images. The stereo matching may comprise (1) extracting substantially in or near real-time feature points of each monocular image in each binocular image, (2) calculating the motion characteristics of the feature points, (3) matching corresponding feature points extracted from the image frames based on the motion characteristics of the feature points, and (4) eliminating mismatch feature points. The depth map calculation may comprise (1) calculating a pixel-based disparity map based on the matched feature points and (2) calculating a depth map based on the extrinsic parameters of the binocular camera. The depth map calculation may comprise filtering and applying a threshold to the depth map to determine or more obstacles. For example, the threshold may be applied to classify objects in the environment having a predetermined size and/or number of pixels in the depth map.

In FIG. 10, the plurality of imaging devices mounted on different sides of the movable object may collectively constitute an onboard multi-ocular/stereo vision sensing system. In some embodiments, the movable object may comprise other sensors (such as ultrasonic sensors, radar, laser, and infrared sensors) that can supplement the vision sensing. In some embodiments, those other sensors (e.g., ultrasonic sensors, radar, laser, and infrared sensors) may be used in conjunction with the multi-ocular/stereo vision sensing system to further increase the sensitivity and/or range of the environmental sensing.

Accordingly, the vision sensing system in FIG. 10 can provide, precisely and in real-time, environmental information ranging from tens of meters to several hundreds of meters surrounding the movable object. The environmental information may include distances of the movable object from various objects in the environment, as well as distances between objects within the environment.

Assessing Suitability and Selective Activation of Imaging Devices

The sensing system controller disclosed herein can be configured to assess suitability of the plurality of imaging devices onboard the movable object for vision sensing. The sensing system controller can further select one or more imaging devices for vision sensing based on their assessed suitability. For example, the sensing system controller can obtain a plurality of first observed physical states of the movable object, based on image data collected by the plurality of imaging devices. The sensing system controller can also obtain an estimated physical state of the movable object, based on sensor data acquired by an IMU onboard the movable object. Subsequently, the sensing system controller can assess a suitability of each imaging device for vision sensing, based on a deviation $D_{13}$ between its observed physical state and the estimated physical state relative to a predetermined threshold $T_{13}$.

An imaging device may be determined to be suitable for vision sensing when the deviation $D_{13}$ for the imaging device is equal to or less than the predetermined threshold $T_{13}$. Conversely, an imaging device may be determined to be unsuitable for vision sensing when the deviation $D_{13}$ for the imaging device is greater than the predetermined threshold $T_{13}$. Accordingly, the sensing system controller can assess which of the plurality of imaging devices are suitable for vision sensing, and which of the plurality of imaging devices are unsuitable for vision sensing. In some cases, the sensing system controller can select a first set of imaging devices that are suitable for vision sensing to be operational, and select a second set of imaging devices that are unsuitable for vision sensing to be non-operational. The sensing system controller can incorporate the first observed physical states (obtained from the image data collected by the first set imaging devices) into the estimated physical state of the movable object, for example using a Kalman filter. In some instances, the sensing system controller can be configured to discard the image data collected by the second set of imaging devices.

In some embodiments, one or more imaging devices from the second set of imaging devices can be changed from non-operational to operational, depending on variations in the deviation $D_{13}$. Variations in the deviation $D_{13}$ may occur as the movable object is moving through different types of environment (e.g., indoor, outdoor, densely-built areas, open areas, different terrains, altitudes, etc.). For example, the deviation $D_{13}$ of those one or more imaging devices may be initially greater than the predetermined threshold $T_{13}$, and therefore those imaging devices may be non-operational. Subsequently, when the deviation $D_{13}$ of those devices changes to be equal or less than the predetermined threshold $T_{13}$, those imaging devices may then be changed from non-operational to operational.

The deviation $D_{13}$ can result from changes in the observed physical state (from vision data). The observed physical states (obtained from vision data) of the movable object can depend on a plurality of different environment types within which the movable object operates. The plurality of different environment types can include distinct characteristics including one or more of the following: (1) weather conditions, (2) object density and distribution, or (3) visual or physical properties of objects located within the different environment types.

In some embodiments, the predetermined threshold $T_{13}$ may be obtained from experimental data. The predetermined threshold $T_{13}$ may be a constant. The predetermined threshold $T_{13}$ may comprise a range of values. In some embodiments, the predetermined threshold $T_{13}$ may be configured to vary depending on one or more of the following: (1) an environment in which the movable object operates; (2) one or more motion characteristics of the movable object; (3) a location of the movable object; or (4) an altitude of the movable object. In some cases, the predetermined threshold $T_{13}$ may be configured to vary in real-time when (1) motion of the movable object causes it to move from one environment to another environment, (2) the one or more motion characteristics of the movable object changes, (3) the location of the movable object changes, and/or (4) the altitude of the movable object changes.

Figure 11:
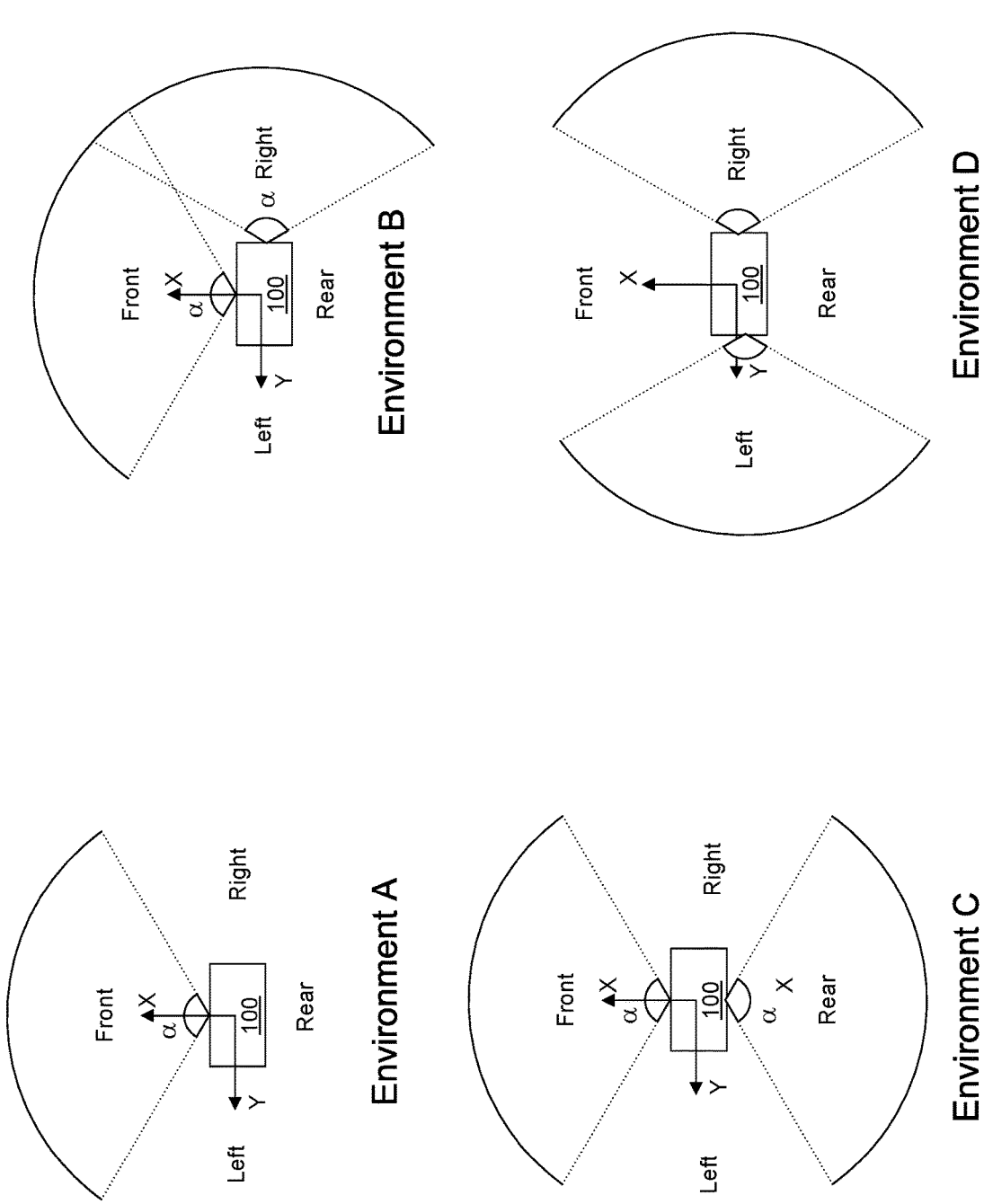
FIG. 11 illustrates selective activation of imaging devices based on their assessed suitability, in accordance with some embodiments.

FIG. 11 illustrates the selective activation of imaging devices based on their assessed suitability, in accordance with some embodiments. A plurality of imaging devices may be coupled to different sides of a movable object (e.g., front, rear, left, and right). A sensing system controller as described elsewhere herein can be configured to assess suitability of the plurality of imaging devices for vision sensing. The sensing system controller can select one or more imaging devices for vision sensing based on their assessed suitability. For example, the sensing system controller can obtain a plurality of first observed physical states of the movable object, based on image data collected by the plurality of imaging devices. The sensing system controller can also obtain an estimated physical state of the movable object, based on sensing data acquired by an IMU onboard the movable object. Subsequently, the sensing system controller can assess a suitability of each imaging device for vision sensing, based on a deviation $D_{13}$ between its first observed physical state and the estimated physical state relative to a predetermined threshold $T_{13}$.

As previously described, the sensing system controller can assess which of the plurality of imaging devices are suitable for vision sensing, and which of the plurality of imaging devices are unsuitable for vision sensing. In some cases, the sensing system controller can select a first set of imaging devices that are suitable for vision sensing to be operational, and select a second set of imaging devices that are unsuitable for vision sensing to be non-operational. The table below, with reference to FIG. 11, shows the operational state of each imaging device as the movable object moves through different environments (A, B, C, and D). $D_{13}$ corresponds to the deviation calculated for each imaging device. The deviation $D_{13}$ is based on the first observed physical state (from vision data) and estimated physical state (from IMU data). $T_{13}$ corresponds to the predetermined threshold to which the deviation $D_{13}$ is compared.

| Imaging device | Environment A | Environment B | Environment C | Environment D |
|---|---|---|---|---|
| Front | $D_{13} \leq T_{13}$ Operational | $D_{13} \leq T_{13}$ Operational | $D_{13} \leq T_{13}$ Operational | $D_{13} > T_{13}$ Non-operational |
| Rear | $D_{13} > T_{13}$ Non-operational | $D_{13} > T_{13}$ Non-operational | $D_{13} \leq T_{13}$ Operational | $D_{13} > T_{13}$ Non-operational |
| Left | $D_{13} > T_{13}$ Non-operational | $D_{13} > T_{13}$ Non-operational | $D_{13} > T_{13}$ Non-operational | $D_{13} \leq T_{13}$ Operational |
| Right | $D_{13} > T_{13}$ Non-operational | $D_{13} \leq T_{13}$ Operational | $D_{13} > T_{13}$ Non-operational | $D_{13} \leq T_{13}$ Operational |

When the movable object is moving through Environment A, the sensing system controller may assess that the front imaging device is suitable for vision sensing, whereas the left, right and rear imaging devices are unsuitable for vision sensing. Accordingly, the sensing system controller can select the front imaging device to be operational, and the left, right and rear imaging devices to be non-operational. The left, right and rear imaging devices can be rendered non-operational, for example by turning off those devices or certain image capture functions of those devices, which may also aid in reducing power consumption.

The difference in assessed suitability of the imaging devices may be a result of different sub-environments and/or object types located in directions extending from different sides of the movable object. For example, weather conditions, lighting, object density, terrain, type of objects, surface texture, may be different as viewed from different sides of the movable object. As an example, when the sun is setting and the front of the movable object is facing west, the light intensity at the front of the movable object may be higher than at the rear of the movable object which is facing east. In another example, the front of the movable object may be facing an area having high object density, whereas the rear or sides of the movable object may be facing sparsely populated or open terrains. As previously mentioned, the imaging devices may be more suitable for imaging certain environments (or sub-environments or objects) than others.

Referring to FIG. 11, as the movable object moves between different environments, the assessed suitability of the imaging devices may change. For example, when the movable object moves from Environment A to Environment B, the sensing system controller may assess that the right imaging device is also suitable for vision sensing (in addition to the front imaging device), whereas the left and rear imaging devices continue to be unsuitable for vision sensing. Accordingly, the sensing system controller can select both the front and right imaging devices to be operational, and the left and rear imaging devices to be non-operational. Similarly, when the movable object moves from Environment B to Environment C, the sensing system controller may assess that the right imaging device has become unsuitable for vision sensing, whereas the rear imaging device is now suitable for vision sensing. Accordingly, the sensing system controller can select both the front and rear imaging devices to be operational, and the left and right imaging devices to be non-operational. Likewise, when the movable object moves from Environment C to Environment D, the sensing system controller may assess that the front and rear imaging devices have become unsuitable for vision sensing, whereas the left and right imaging devices are now suitable for vision sensing. Accordingly, the sensing system controller can select both the left and right imaging devices to be operational, and the front and rear imaging devices to be non-operational.

The accuracy of the vision data can be improved by selectively activating different imaging devices on different parts of the movable object for vision sensing, as the movable object traverses through a variety of different environments. The selective activation of the imaging devices can also reduce power consumption, which can extend the length of operation of the movable object (e.g., flight time of an unmanned aerial vehicle).

Figure 12:
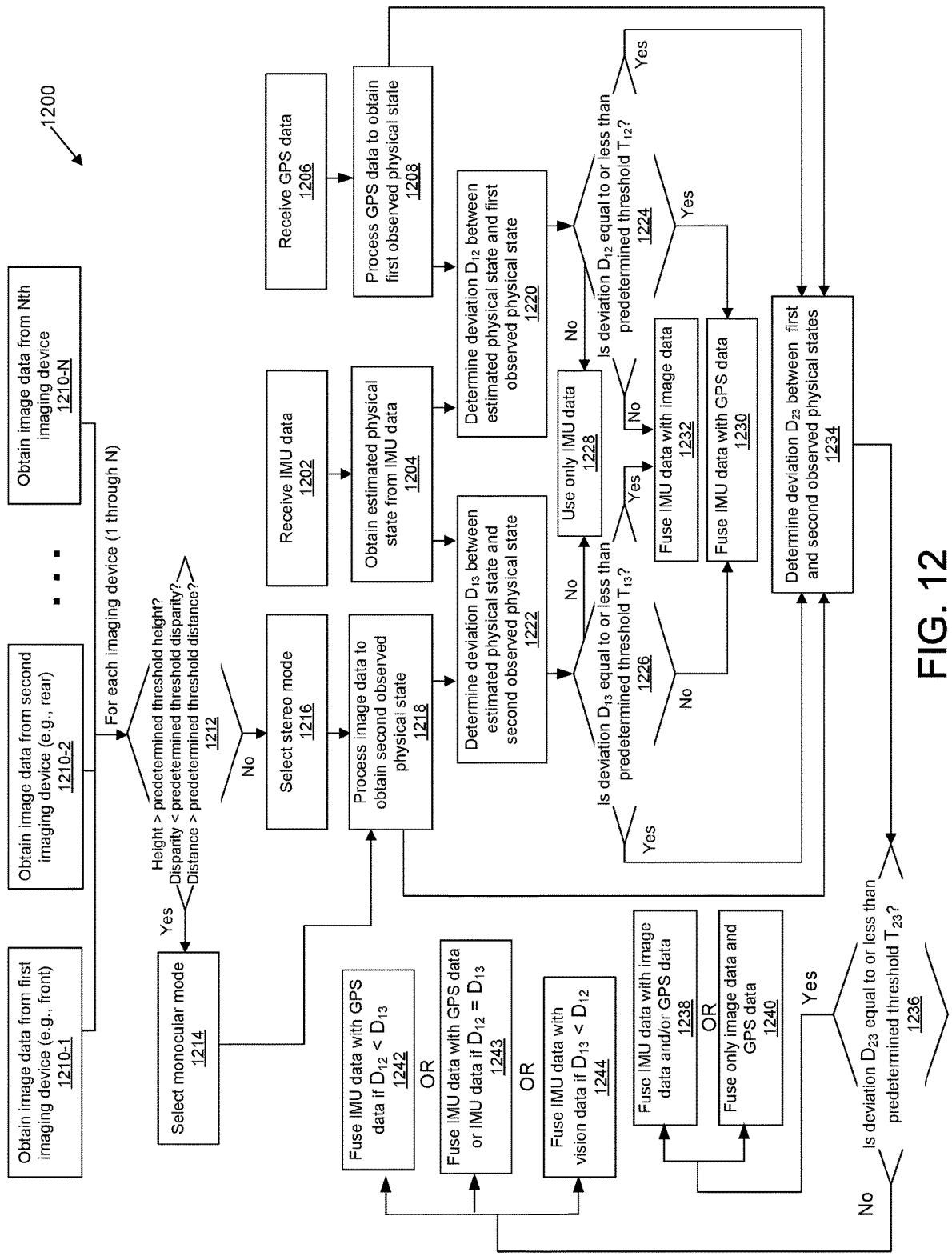
FIG. 12 illustrates a multi-thread hierarchical decision algorithm for selecting which sensors and/or data to utilize under various conditions, in accordance with some embodiments.

FIG. 12 illustrates a multi-thread hierarchical decision algorithm for selecting which sensors and/or sensing data to utilize under various conditions, in accordance with some embodiments. A movable object may include different types of sensing systems, as described elsewhere herein. Referring to FIG. 12, a movable object may comprise a plurality of imaging devices, an IMU, and a GPS sensor onboard the movable object. The plurality of imaging devices may be coupled to different sides of the movable object, for example as shown in FIG. 10. A sensing system controller may be in communication with the imaging devices, IMU, and GPS sensor. The sensing system controller may be located onboard or remote from the movable object. In some embodiments, the sensing system controller may be located in a remote terminal that can be used to control various operations of the movable object. The IMU, GPS sensor, and imaging devices may have different sampling frequencies. For example, the GPS sensor and the imaging devices may have lower sampling frequencies than the IMU. In some embodiments, the sampling frequency of the GPS sensor and/or the imaging devices may be one, two, three or more orders of magnitude lower than the sampling frequency of the IMU. The sampling frequency of the GPS sensor and imaging devices may or may not be the same. In some cases, the sampling frequency of the GPS sensor may be higher than the sampling frequency of the imaging devices. In other cases, the sampling frequency of the GPS sensor may be lower than the sampling frequency of the imaging devices. The sampling frequencies of the IMU, GPS sensor, and imaging devices may be fixed or variable.

The sensing system controller can be configured to obtain sensing data from the IMU (step 1202). The sensing system controller can determine, using the sensing data of the IMU, an estimated physical state of the movable object during a time duration when the sensing data of the GPS sensor and/or the imaging devices is unavailable or is not updated (step 1204). The sensing system controller may be configured to receive sensing data from the GPS sensor (step 1206). The sensing system controller may process the sensing data to obtain a first observed physical state of the movable object (step 1208).

The sensing system controller may be configured to obtain vision data from the plurality of imaging devices (step 1210). For example, the sensing system controller may obtain vision data from a first imaging device (step 1210-1), second imaging device (step 1210-2), and up to Nth imaging device (step 1210-N), where N may be any integer greater than two. For each imaging device (1 through N), the sensing system controller may determine whether one or more of the following conditions described in FIGS. 7 and 8 are met, for example by comparing (1) the height of the movable object from a reference surface to a predetermined threshold height, (2) a disparity between matched points to a predetermined threshold disparity, and/or (3) a distance of the movable object from a target to a predetermined threshold distance (step 1212). The sensing system controller may control an imaging device to operate in a monocular mode (step 1214) when one or more of conditions (1) through (3) are met. In some embodiments, an imaging device is operated in a monocular mode when at least two of the above conditions are met. In other embodiments, an imaging device is operated in a monocular mode only when all three of the above conditions are met. Conversely, the sensing system controller may control the respective imaging device to operate in a stereo mode (step 1216) when at least one of conditions (1) through (3) are not met. In some cases, an imaging device is operated in a stereo mode when at least two of the above conditions are not met. Alternatively, an imaging device is operated in a stereo mode when all three of the above conditions are not met.

Next, the sensing system controller can process the vision data to obtain a second observed physical state, from each imaging device (step 1218). When an imaging device is operated in the stereo mode (step 1216), the second observed physical state can be obtained from 3-D depth, positional, and/or motion information obtained from two or more stereoscopic images captured by the imaging device. Conversely, when an imaging device is operated in the monocular mode (step 1214), the second observed physical state can be obtained from positional and/or motion information obtained from two or more images captured by the imaging device.

Each time the sensing data from the GPS sensor becomes available or is updated, the sensing system controller is configured to perform a check on the new sensing data. The check comprises determining a deviation $D_{12}$ between the estimated physical state and the first observed physical state of the movable object (step 1220). The deviation $D_{12}$ is a measure of dissimilarity between the first observed physical state and the estimated physical state. The deviation $D_{12}$ is indicative of a validity of the GPS data relative to the IMU data. The deviation $D_{12}$ can be determined using one or more statistical methods. In some embodiments, the deviation $D_{12}$ can be a Mahalanobis distance or a Euclidean distance calculated between the first observed physical state and the estimated physical state.

Similarly, each time the sensing data from the imaging devices becomes available or is updated, the sensing system controller is configured to perform a check on the new sensing data. The check comprises determining a deviation $D_{13}$ between the estimated physical state and the second observed physical state of the movable object (step 1222). The deviation $D_{13}$ is a measure of dissimilarity between the second observed physical state and the estimated physical state. The deviation $D_{13}$ is indicative of a validity of the vision data relative to the IMU data. The deviation $D_{13}$ can be determined using one or more statistical methods. In some embodiments, the deviation $D_{13}$ can be a Mahalanobis distance or a Euclidean distance calculated between the second observed physical state and the estimated physical state.

The sensing system controller can be configured to compare the deviation $D_{12}$ to a predetermined threshold $T_{12}$ (step 1224), and the deviation $D_{13}$ to a predetermined threshold $T_{13}$ (step 1226). If (1) the deviation $D_{12}$ is greater than the predetermined threshold $T_{12}$ and (2) the deviation $D_{13}$ is greater than the predetermined threshold $T_{13}$, the sensing system controller is configured to determine the physical state of the movable object using only the estimated physical state from the IMU data, without using the first and second observed physical states from the GPS data and vision data (step 1228). In such instances, the estimated physical state from the IMU data may be selected to represent the physical state of the movable object. In some embodiments, the sensing system controller may be configured to discard the GPS data and vision data, if (1) the deviation $D_{12}$ is greater than the predetermined threshold $T_{12}$ and (2) the deviation $D_{13}$ is greater than the predetermined threshold $T_{13}$.

In some embodiments, if (1) the deviation $D_{12}$ is equal to or less than the predetermined threshold $T_{12}$ and (2) the deviation $D_{13}$ is greater than the predetermined threshold $T_{13}$, the sensing system controller is configured to determine the physical state of the movable object, by updating the estimated physical state with the first observed physical state from the GPS sensor, without using the second observed physical state from the imaging devices. For example, the sensing controller may fuse the IMU data with only the GPS data to obtain the physical state of the movable object (step 1230). In some embodiments, the sensing system controller may be configured to discard the vision data, if the deviation $D_{13}$ is greater than the predetermined threshold $T_{13}$.

Conversely, in other embodiments, if (1) the deviation $D_{12}$ is greater than the predetermined threshold $T_{12}$ and (2) the deviation $D_{13}$ is equal to or less than the predetermined threshold $T_{13}$, the sensing system controller is configured to determine the physical state of the movable object, by updating the estimated physical state with the second observed state from the imaging devices, without using the first observed physical state from the GPS sensor. For example, the sensing controller may fuse the IMU data with only the vision data to obtain the physical state of the movable object (step 1232). In some embodiments, the sensing system controller may be configured to discard the GPS data, if the deviation $D_{12}$ is greater than the predetermined threshold $T_{12}$.

As noted above, the estimated physical state may be obtained from the IMU data, the first observed physical state may be obtained from the GPS data, and the second observed physical state may be obtained from the vision data. The IMU data can be used to check the validity of the GPS data. For example, an IMU-calculated displacement (based on the estimated physical state) and a GPS-calculated displacement (based on the first observed physical state) between two different time points can be obtained. The deviation $D_{12}$ between the GPS-calculated displacement and the IMU-calculated displacement can be calculated. If the deviation $D_{12}$ is equal to or less than the predetermined threshold $T_{12}$, this may mean that the GPS data is reliable (or accurate). Conversely, if the deviation $D_{12}$ is greater than the predetermined threshold $T_{12}$, this may mean that the GPS data is unreliable (or inaccurate).

Likewise, the IMU data can be used to check the validity of the vision data. For example, an IMU-calculated displacement (based on the estimated physical state) and a vision-calculated displacement (based on the second observed physical state) from a current frame to the key frame can be obtained. The deviation $D_{13}$ between the vision-calculated displacement and the IMU-calculated displacement can be calculated. If the deviation $D_{13}$ is equal to or less than the predetermined threshold $T_{13}$, then the vision data is determined to be accurate (or valid). Conversely, if the deviation $D_{13}$ is greater than the predetermined threshold $T_{13}$, then the vision data is determined to be inaccurate (or invalid). Accordingly, the IMU data can be used to check the validity of different sets of sensing data using the above method. In addition, the IMU data can be updated (fused) with different sets of sensing data, depending on their deviations relative to different predetermined thresholds.

In some embodiments, the sensing data from the GPS sensor and the sensing data from the imaging devices can be cross-checked against each other, after they have been cross-checked against the sensing data from the IMU. Referring to FIG. 12, if (1) the deviation $D_{12}$ is equal to or less the predetermined threshold $T_{12}$ and (2) the deviation $D_{13}$ is equal to or less than the predetermined threshold $T_{13}$, the sensing system controller is further configured to determine a deviation $D_{23}$ between the first observed physical state and the second observed physical state of the movable object (step 1234). The deviation $D_{23}$ is a measure of dissimilarity between the first observed physical state and the second observed physical state. The deviation $D_{23}$ is indicative of a validity of the sensing data of the imaging devices relative to the GPS sensor (or a validity of the sensing data of the GPS sensor relative to the imaging devices). The deviation $D_{23}$ can be determined using one or more statistical methods. In some embodiments, the deviation $D_{23}$ can be a Mahalanobis distance or a Euclidean distance calculated between the first observed physical state and the second observed physical state.

The sensing system controller can be configured to compare the deviation $D_{23}$ to a predetermined threshold $T_{23}$ (step 1236). If the deviation $D_{23}$ is equal to or less than the predetermined threshold $T_{23}$, the sensing system controller is configured to determine the physical state of the movable object, by updating the estimated physical state with (1) the first observed physical state from the GPS data and/or (2) the second observed physical state from the vision data. For example, the sensing controller may fuse the IMU data with the vision data and/or GPS data to obtain the physical state of the movable object (step 1238). Alternatively, the sensing controller may fuse the vision data and the GPS data to obtain the physical state of the movable object, without using the IMU data (step 1240).

Conversely, if the deviation $D_{23}$ is greater than the predetermined threshold $T_{23}$, the sensing system controller is configured to determine the physical state of the movable object, based on the magnitude of the deviations $D_{12}$ and $D_{13}$ relative to each other. For example, if the deviation $D_{12}$ is less than the deviation $D_{13}$, the sensing controller is configured to update the estimated physical state with the first observed physical state from the GPS data, without using the second observed physical state from the vision data. For example, the sensing controller may fuse the IMU data with only the GPS data to obtain the physical state of the movable object (step 1242). In some embodiments, the sensing system controller may be configured to discard the vision data, if the deviation $D_{12}$ is less than the deviation $D_{13}$ and the deviation $D_{23}$ is greater than the predetermined threshold $T_{23}$.

In some cases, if the deviation $D_{13}$ is equal to the deviation $D_{12}$, the sensing controller is configured to update the estimated physical state with either the first observed physical state from the GPS data, or the second observed physical state from the vision data. For example, the sensing controller may fuse the IMU data with the GPS data or the vision data to obtain the physical state of the movable object (step 1243).

Conversely, if the deviation $D_{13}$ is less than the deviation $D_{12}$, the sensing controller is configured to update the estimated physical state with the second observed physical state from the vision data, without using the first observed physical state from the GPS data. For example, the sensing controller may fuse the IMU data with only the vision data to obtain the physical state of the movable object (step 1244). In some embodiments, the sensing system controller may be configured to discard the GPS data, if the deviation $D_{13}$ is less than the deviation $D_{12}$ and the deviation $D_{23}$ is greater than the predetermined threshold $T_{23}$.

Accordingly, the GPS data can be used to check the validity of the vision data (or the vision data can be used to check the validity of the GPS data). For example, a GPS-calculated displacement (based on the first observed physical state) and a vision-calculated displacement (based on the second observed physical state) from a current frame to the key frame can be obtained. The deviation $D_{23}$ between the vision-calculated displacement and the GPS-calculated displacement can be calculated. If the deviation $D_{23}$ is equal to or less than the predetermined threshold $T_{23}$, then both the vision data and the GPS data is determined to be accurate (or valid). Conversely, if the deviation $D_{23}$ is greater than the predetermined threshold $T_{23}$, one of the vision data and the GPS data may be selected to be updated (fused) with the IMU data, depending on their deviations relative to each other and with respect to the IMU data. Accordingly, the validity and usefulness of the GPS data and vision data can cross-checked against each other using the above method.

In the example of FIG. 12, the physical state of the movable object can be determined by updating the estimated physical state to incorporate the first and/or second observed physical states obtained from the GPS data and/or vision data. This can be achieved, for example, by fusing the estimated physical state with the first and/or second observed physical states using any appropriate sensor fusion techniques. In some embodiments, the first and second observed physical states may be fused together without including the estimated physical state. The sensor fusion techniques can include an algorithm based on a Kalman filter, an extended Kalman filter (EKF), an unscented Kalman filter (UKF), a particle filter (PF), or suitable combinations thereof. In some embodiments, the sensing system controller can also exclude sensing data from one or more of the GPS sensor or imaging devices from the sensor fusion analysis, as previously described. For example, sensing data from one or more of the GPS sensor or imaging devices may be excluded if their deviations are greater than certain predetermined thresholds. Accordingly, the sensing system controller can be configured to select different data for sensor fusion in order to reduce processing time and optimize computing resources.

The sensor fusion approaches described herein can be applied to various types of functionalities, including navigation, object recognition, and obstacle avoidance. In some embodiments, environmental data obtained using sensor fusion results can be used to improve the robustness, safety, and flexibility of operation of a movable object by providing accurate location information as well as information regarding potential obstructions. The environmental data can be provided to a user (e.g., via remote controller or terminal, mobile device, or other user device) so as to inform the user's manual control of the movable object. Alternatively or in combination, the environmental data can be used for semi-autonomous or fully autonomous control systems to direct the automated flight of the movable object.

The obstacles described herein may be substantially stationary (e.g., buildings, plants, structures) or substantially mobile (e.g., human beings, animals, vehicles, or other objects capable of movement). Some obstacles may include a combination of stationary and mobile components (e.g., a windmill). Mobile obstacles or obstacle components may move according to a predetermined or predictable path or pattern. For example, the movement of a car may be relatively predictable (e.g., according to the shape of the road). Alternatively, some mobile obstacles or obstacle components may move along random or otherwise unpredictable trajectories. For example, a living being such as an animal may move in a relatively unpredictable manner. Different types of environments may be associated with different amounts and types of obstacles. For example, a high altitude environment may have few or no obstacles. In contrast, an indoor environment or a low altitude environment may have more obstacles. Some types of low altitude, outdoor environments (e.g., fields and other flat, open spaces) may have fewer obstacles than other types (e.g., urban settings and other highly populated areas, forests). Accordingly, a movable object described herein operating within an environment with a high obstacle density may be exposed to an increased risk of collisions, near-misses, or other safety incidents. Conversely, movable object operation within a low obstacle density environment may be relatively safe. Mobile obstacles may pose an increased risk compared to stationary obstacles, as mobile obstacles may collide with or obstruct the movable object independently of any action taken by the movable object. The sensor fusion approaches can be used to improve detection of obstacles within the environment in which the movable object operates, as described elsewhere herein.

The movable object described herein can be configured to move along different motions path between a plurality of locations. For many real world applications, knowing merely the position and motion of the movable object may not be sufficient for real-time navigation. For example, the surrounding environment may include obstacles in the path between the movable object and a target or target destination. These obstacles may be stationary, capable of movement, or in motion. As such, information about the external environment may be necessary for the movable object to avoid such obstacles by re-planning its path in real-time. In some embodiments, information about the external environment may be provided in a 3D map based on one or more images captured by one or more imaging devices onboard the movable object. A motion path for the movable object can be generated by using the 3D map.

For example, the embodiments disclosed herein can be used to perform obstacle avoidance maneuvers in order to prevent a movable object from colliding with environmental objects. In some embodiments, obstacle detection and avoidance can be automated, thereby improving safety and reducing user responsibility for avoiding collisions. This approach may be advantageous for inexperienced operators as well as in situations where the user cannot readily perceive the presence of obstacles near the movable object. Additionally, the implementation of automated obstacle avoidance can reduce the safety risks associated with semi-autonomous or fully autonomous movable object navigation. Furthermore, the multi-sensor fusion techniques described herein can be used to generate more accurate environmental representations, thus improving the reliability of such automated collision prevention mechanisms.

As previously described, a movable object may comprise a plurality of imaging devices for vision sensing. At least one imaging device may be capable of operating in a multi-ocular mode. For example, an imaging device may be a binocular camera configured to capture a binocular image comprising a left-eye image and a right-eye image. In some cases, the binocular image can be correlated/calibrated with the image captured by another camera (e.g., a monocular camera).

A depth map may be generated using the binocular image, by stereo matching of the left-eye image and the right-eye image. The left-eye image and right-eye image may be matched to obtain a depth image in which the position of obstacles/objects in an environment can be detected. In some embodiments, a depth map may be generated using multiple cameras mounted on different sides of the movable object. The stereo matching may be performed using real-time block matching (BM) or semi-global block matching (SGBM) algorithms implemented using one or more processors. In some embodiments, ultrasonic data from an ultrasonic sensor may be additionally used to detect the position/distance of an object having no obvious texture (e.g., a binocular camera may not be capable of detecting the position of a white-colored wall, or a glass wall).

A 3D map of the external environment may be generated by correlating the binocular image or any image to the depth map. For example, the left-eye image and/or the right-eye image may be mapped to the depth map. In some cases, the image captured by another camera (e.g., a monocular camera) may be mapped to the depth map. The depth map may comprise a plurality of pixel points. A valid pixel point may correspond to an obstacle in the external environment. The relationship between pixel points and obstacles may be one-to-many or many-to-one. For example, a valid pixel point may correspond to a plurality of obstacles. Alternatively, a plurality of valid pixel points may correspond to an obstacle. In some cases, a group of valid pixel points may correspond to a group of obstacles. A valid pixel point has a value that is greater than 0. Conversely, an invalid pixel point is a point that is unidentifiable from the mapped image. An invalid pixel point has a value that is equal to or less than 0. Objects that have no obvious texture or are transparent may show up invalid pixel points in the image. In some embodiments, ultrasonic data from ultrasonic imaging or proximity data obtained using proximity sensors may be used to supplement the visual correlation to identify those invalid pixel points. The proximity sensors may include a lidar sensor located on the movable object. Ultrasonic data from the ultrasonic sensor can be used to detect the position/distance of an object having no obvious texture or that is transparent.

Next, 3D spatial points corresponding to the pixel points in the depth map may be generated. A 3D spatial point corresponding to a pixel point in the depth map may be given by:

$$\begin{pmatrix} X \\ Y \\ Z \end{pmatrix} = \begin{pmatrix} d(x-c_x)/f \\ d(y-c_y)/f \\ d \end{pmatrix}, \text{if } d > 0.$$

where d is a depth in the depth map, f is a focal length of the imaging device, (cx, cy) is an offset from a central point (centroid) of the movable object, and (x, y) is the pixel point on the depth map. A plurality of 3D spatial points may be distributed into a plurality of cells of an occupancy grid. The position of the movable object may be located at the center of the occupancy grid. In some cases, the position of the movable object may be located another portion (e.g., edge) of the occupancy grid. The occupancy grid may be used to define a 3D map of the spatial environment surrounding the movable object.

The occupancy grid may have plurality of cells. The occupancy grid may have a size of $n_x \times n_y \times n_z$, where $n_x$ is the number of cells along an x-axis, $n_y$ is the number of cells along a y-axis, and $n_z$ is the number of cells along a z-axis. $n_x$, $n_y$, and $n_z$ may be any integer, and may be the same or different. In some embodiments, $n_x = n_y = 80$ and $n_z = 40$. In some embodiments, $n_x$ and $n_y$ may be less than 80 or greater than 80. In some embodiments, $n_z$ may be less than 40 or greater than 40. Each cell in the occupancy grid may have a size of m×m×m, where m may be any dimension. In some embodiments, m may be less than or equal to 0.1 meters, 0.2 meters, 0.3 meters, 0.4 meters, 0.5 meters, or 1 meter. In some embodiments, m may be greater than 1 meter, 1.1 meter, 1.2 meter, 1.3 meter, 1.4 meter, 1.5 meter, or 2 meters.

The occupancy grid may have i number of cells, where $i = n_x \times n_y \times n_z$. Each cell may be denoted as an i-th cell. For example, i=1 may denote a first cell, and i=10 may denote a tenth cell. For each i-th cell, the number of 3D spatial points falling into the cell may be determined. A 3D map of the environment may be generated by determining, for each i-th cell, whether a number of 3D spatial points falling within the i-th cell is greater than a predetermined threshold value $\tau$. Each i-th cell may have a binary state $C_i$. When the number of 3D spatial points falling within the i-th cell is greater than the predetermined threshold value $\tau$, then $C_i=1$. When the number of 3D spatial points falling within the i-th cell is equal to or less than the predetermined threshold value $\tau$, then $C_i=0$. The predetermined threshold value T may be determined based on a sampling frequency of the captured images, and an accuracy of the 3D spatial point as obtained from the depth map. The predetermined threshold value $\tau$ may increase when the sampling frequency increases and when the number of 3D spatial points falling within the cell increases. The predetermined threshold value $\tau$ may decrease when the accuracy of the 3D spatial point increases. The predetermined threshold value $\tau$ may have a range of values. For example, the predetermined threshold value may range from about 5 to about 30. In some cases, the predetermined threshold value may range from less than 5 to more than 30.

As previously mentioned, ultrasonic data may be used to supplement the visual correlation to identify invalid pixel points. When a valid ultrasonic reading $d_s$ is detected, the state $C_i$ of all cells having a distance of $d_s$ within the sonar range may be set to 1.

Figure 13:
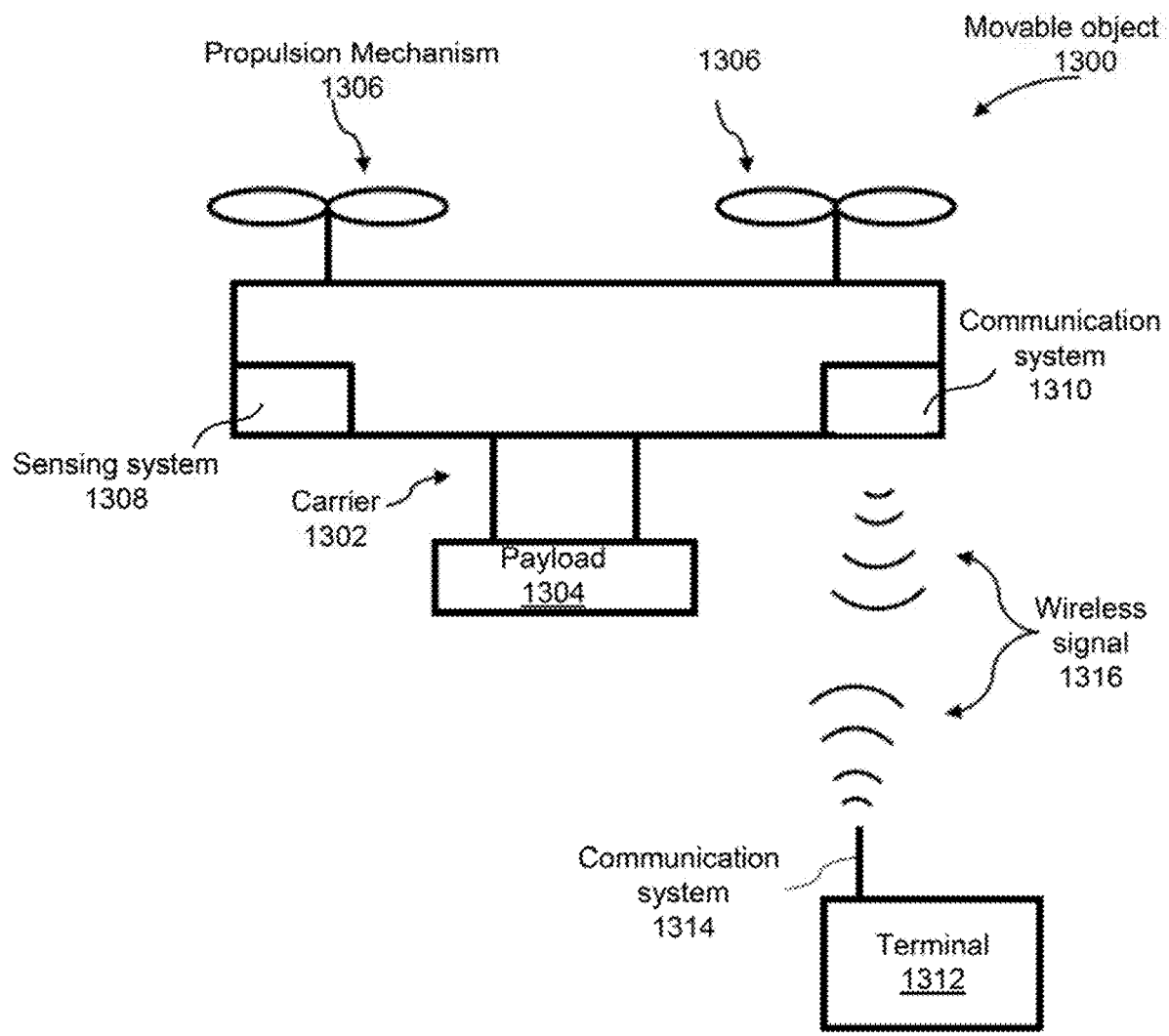
FIG. 13 illustrates a movable object including a carrier and a payload, in accordance with some embodiments.

The embodiments described herein may be applicable to any movable object. FIG. 13 illustrates a movable object 1300 including a carrier 1302 and a payload 1304, in accordance with embodiments. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. For example, the propulsion mechanisms 1306 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1306 may be controlled independently of the other propulsion mechanisms. Alternatively, the propulsion mechanisms 1306 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1314, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method of selecting a vision sensing mode, the method comprising:
    obtaining a spatial configuration of a plurality of imaging devices relative to one another and to a movable object, wherein the plurality of imaging devices are coupled to the movable object and comprise (1) a first imaging device configured to operate in a multi-ocular mode and (2) a second imaging device configured to operate in a monocular mode;
    determining at least one of: (a) a distance of the movable object to an object or surface lying within a field-of-view of at least one of the imaging devices, wherein the distance is determined based in part on the obtained spatial configuration, (b) a disparity between matched points in stereoscopic images acquired by the first imaging device, or (c) an environment in which the plurality of imaging devices are operated; and
    selecting, based on the determining, either (1) the first imaging device to acquire image data in the multi-ocular mode or (2) the second imaging device to acquire image data in the monocular mode, including:
        comparing the disparity between the matched points to a predefined threshold disparity;
        selecting the first imaging device to acquire the image data in response to the disparity being greater than the predefined threshold disparity; and
        selecting the second imaging device to acquire the image data in response to the disparity being equal to or less than the predefined threshold disparity;
        wherein the predefined threshold disparity is configured to vary depending on information of the environment, the information including at least one of weather conditions within the environment, object density and distribution within the environment, or visual or physical properties of objects located within the environment.

2. The method of claim 1, wherein the multi-ocular mode comprises a binocular mode or stereoscopic mode.

3. The method of claim 1, wherein at least one of the plurality of imaging devices is configured to switch between the multi-ocular mode and the monocular mode, such that the at least one of the imaging devices operates in either the multi-ocular mode or the monocular mode.

4. The method of claim 1, wherein the plurality of imaging devices further comprise a plurality of first imaging devices operably coupled to different sides of the movable object.

5. The method of claim 1, wherein the second imaging device is operably coupled to the movable object via a carrier.

6. The method of claim 5, wherein the second imaging device is configured to rotate about at least one axis relative to the movable object via the carrier.

7. The method of claim 1, wherein the movable object is an unmanned aerial vehicle (UAV).

8. The method of claim 1, wherein the distance is determined using one or more proximity sensors and/or the first imaging device.

9. The method of claim 1, wherein the distance is determined using 3-D depth, positional, and/or motion information obtained from one or more stereoscopic images captured by the first imaging device.

10. The method of claim 1, wherein the distance is determined based on an altitude of the movable object measured using an onboard barometer and/or one or more proximity sensors.

11. The method of claim 1, wherein the selecting further comprises:
    comparing the distance to a predefined threshold distance;
    selecting the first imaging device to acquire the image data in response to the distance being equal to or less than the predefined threshold distance; and
    selecting the second imaging device to acquire the image data when in response to the distance being greater than the predefined threshold distance.

12. The method of claim 11, wherein the predefined threshold distance is obtained from experimental data.

13. The method of claim 11, wherein the predefined threshold distance is configured to vary depending on at least one of: (1) the environment in which the movable object is operated, (2) a location of the movable object, or (3) an altitude of the movable object.

14. The method of claim 1, wherein the predefined threshold disparity is further configured to vary depending on an altitude of the movable object.

15. The method of claim 1, further comprising:
calculating one or more motion characteristics of the movable object based on the image data obtained by the first imaging device and/or the second imaging device.

16. The method of claim 1, wherein obtaining the spatial configuration includes:
obtaining a translational movement of the plurality of imaging devices relative to one another and relative to an IMU of the movable object based on mounting positions of the plurality of imaging devices and the IMU.

17. The method of claim 1, wherein obtaining the spatial configuration includes:
obtaining a rotational movement of the plurality of imaging devices relative to one another and relative to the IMU of the movable object using a hand-eye calibration method.

18. The method of claim 1, wherein:
the first imaging device is rigidly coupled to the movable object; and
the second imaging device is coupled to the movable object via a multi-axis gimbal.

19. A system for selecting a vision sensing mode, the system comprising one or more processors that are configured to:
obtain a spatial configuration of a plurality of imaging devices relative to one another and to a movable object, wherein the plurality of imaging devices are coupled to the movable object and comprise (1) a first imaging device configured to operate in a multi-ocular mode and (2) a second imaging device configured to operate in a monocular mode;
determine at least one of: (a) a distance of the movable object to an object or surface lying within a field-of-view of at least one of the imaging devices, wherein the distance is determined based in part on the obtained spatial configuration, (b) a disparity between matched points in stereoscopic images acquired by the first imaging device, or (c) an environment in which the plurality of imaging devices are operated; and
select, based on the determining, either (1) the first imaging device to acquire image data in the multi-ocular mode or (2) the second imaging device to acquire image data in the monocular mode, including:
comparing the disparity between the matched points to a predefined threshold disparity;
selecting the first imaging device to acquire the image data in response to the disparity being greater than the predefined threshold disparity; and
selecting the second imaging device to acquire the image data in response to the disparity being equal to or less than the predefined threshold disparity;
wherein the predefined threshold disparity is configured to vary depending on information of the environment, the information including at least one of weather conditions within the environment, object density and distribution within the environment, or visual or physical properties of objects located within the environment.

* * * * *